US012010355B2

(12) United States Patent
Lazar et al.

(10) Patent No.: US 12,010,355 B2
(45) Date of Patent: Jun. 11, 2024

(54) LIVE MEDIA CONTENT DELIVERY SYSTEMS AND METHODS

(71) Applicant: Lazar Entertainment Inc., Toronto (CA)

(72) Inventors: Dave Lazar, Toronto (CA); Stephen Seguin, Toronto (CA); Doug Doe, Toronto (CA); Lionel Nicolas, Toronto (CA); Tristan Matthews, Toronto (CA)

(73) Assignee: Lazar Entertainment Inc., Toronto (CA)

( * ) Notice: Subject to any disclaimer, the term of this patent is extended or adjusted under 35 U.S.C. 154(b) by 0 days.

(21) Appl. No.: 17/627,635

(22) PCT Filed: Jul. 23, 2020

(86) PCT No.: PCT/CA2020/051016
§ 371 (c)(1),
(2) Date: Jan. 14, 2022

(87) PCT Pub. No.: WO2021/012051
PCT Pub. Date: Jan. 28, 2021

(65) Prior Publication Data
US 2022/0408120 A1  Dec. 22, 2022

Related U.S. Application Data

(60) Provisional application No. 62/877,531, filed on Jul. 23, 2019.

(51) Int. Cl.
*H04N 21/2187* (2011.01)
*H04N 21/2343* (2011.01)
(Continued)

(52) U.S. Cl.
CPC . *H04N 21/2187* (2013.01); *H04N 21/234309* (2013.01); *H04N 21/2662* (2013.01);
(Continued)

(58) Field of Classification Search
CPC ....... H04N 21/2187; H04N 21/234309; H04N 21/2662; H04N 21/2743; H04N 21/4788; H04N 21/64792; H04N 21/222
See application file for complete search history.

(56) References Cited

U.S. PATENT DOCUMENTS

| 2005/0089043 A1* | 4/2005 | Seckin | ................... H04L 65/80 370/395.21 |
|---|---|---|---|
| 2006/0140591 A1 | 6/2006 | Estevez et al. | |

(Continued)

FOREIGN PATENT DOCUMENTS

| CN | 106303430 A | 1/2017 |
|---|---|---|
| CN | 106534954 A | 3/2017 |

(Continued)

OTHER PUBLICATIONS

International Search Report and Written Opinion for PCT/CA2020/051016, ISA/CA, dated Oct. 29, 2020, Entire Document.

*Primary Examiner* — Alazar Tilahun
(74) *Attorney, Agent, or Firm* — Dickinson Wright LLP; Matthew D. Powell

(57) ABSTRACT

Methods, systems and arrangements are described herein for providing low-latency content delivery networks usable for widespread broadcasting of live streaming media, such as live interactive streaming media, over IP networks. Also described are methods, systems and arrangements for enabling low-latency live streaming media to be made available to a wide range of different viewer devices having various capabilities, and under various network conditions. Also provided are methods, systems and arrangements for low-latency creation of the live streaming media broadcasts.

11 Claims, 21 Drawing Sheets

(51) Int. Cl.
*H04N 21/2662* (2011.01)
*H04N 21/2743* (2011.01)
*H04N 21/4788* (2011.01)
*H04N 21/647* (2011.01)

(52) U.S. Cl.
CPC ..... *H04N 21/2743* (2013.01); *H04N 21/4788* (2013.01); *H04N 21/64792* (2013.01)

(56) References Cited

U.S. PATENT DOCUMENTS

| | | | |
|---|---|---|---|
| 2006/0184977 | A1 | 8/2006 | Mueller |
| 2007/0230568 | A1* | 10/2007 | Eleftheriadis .......... H04N 19/48 375/240.1 |
| 2007/0263087 | A1 | 11/2007 | Hong et al. |
| 2008/0175325 | A1 | 7/2008 | Hannuksela et al. |
| 2011/0096828 | A1* | 4/2011 | Chen ................. H04N 21/8456 375/E7.126 |
| 2011/0219307 | A1 | 9/2011 | Mate et al. |
| 2012/0155554 | A1 | 6/2012 | Magee et al. |
| 2012/0311126 | A1 | 12/2012 | Jadallah et al. |
| 2013/0325970 | A1 | 12/2013 | Roberts |
| 2013/0328997 | A1 | 12/2013 | Desai |
| 2015/0002619 | A1* | 1/2015 | Johnston ............. H04L 65/1108 348/14.12 |
| 2015/0078295 | A1 | 3/2015 | Mandyam et al. |
| 2015/0082021 | A1 | 3/2015 | Mandyam |
| 2015/0088977 | A1 | 3/2015 | Monesson |
| 2015/0341634 | A1* | 11/2015 | Jiang .................... H04N 19/136 375/240.02 |
| 2015/0350723 | A1* | 12/2015 | He ..................... H04N 21/6175 725/82 |
| 2016/0119399 | A1 | 4/2016 | Glass et al. |
| 2016/0149984 | A1* | 5/2016 | Prajapat ............. H04L 65/1069 370/329 |
| 2016/0373693 | A1 | 12/2016 | Segal et al. |
| 2018/0020098 | A1 | 1/2018 | Cliche |
| 2018/0063556 | A1 | 3/2018 | Kalmanson et al. |
| 2018/0152764 | A1 | 5/2018 | Taylor et al. |
| 2018/0192061 | A1 | 7/2018 | He |
| 2018/0288449 | A1 | 10/2018 | Zalewski et al. |
| 2018/0288499 | A1 | 10/2018 | Niemeyer |
| 2018/0310033 | A1 | 10/2018 | Johnson |
| 2018/0316600 | A1 | 11/2018 | Renard et al. |
| 2019/0082027 | A1* | 3/2019 | Choi .................... H04L 67/568 |

FOREIGN PATENT DOCUMENTS

| | | |
|---|---|---|
| CN | 108040038 A | 5/2018 |
| EP | 3028239 B1 | 9/2018 |
| WO | 2013127459 A1 | 9/2013 |
| WO | 20180213481 A1 | 11/2018 |
| WO | WO/2019/075581 A1 | 4/2019 |
| WO | WO/2021/012054 A1 | 1/2021 |

* cited by examiner

LIVE MEDIA CONTENT DELIVERY SYSTEMS AND METHODS

CROSS REFERENCE TO RELATED APPLICATION

This application claims priority to U.S. Provisional Patent Application Ser. No. 62/877,531 filed on Jul. 23, 2019, the contents of which are incorporated herein by reference in their entirety.

FIELD OF THE INVENTION

The following relates generally to transport, handling and distribution of streaming media, and more particularly to live media stream content delivery systems and methods.

BACKGROUND OF THE INVENTION

Production of live, professional-quality shows such as television news and coverage of sports events had traditionally been the domain solely of sophisticated media organizations that had access to and control over expensive studio equipment, studio space, and trained personnel.

User-generated media content such as video and audio has become extremely popular. This has been brought about by users' interest in taking advantage of the high-quality video- and audio-capture capabilities of modern portable user devices, the ubiquity of high-speed networks, the advantages accruing from increasingly-reliable communications infrastructures, and the availability of new media platforms such as YouTube, Twitch, Periscope, and Facebook Live, to which users can both navigate and provide content.

PCT International Patent Application Publication No WO2019/075581 to Lazar Entertainment Inc. entitled "SYSTEMS AND METHODS FOR BROADCASTING LIVE MEDIA STREAMS" (Lazar), the contents of which are incorporated by reference herein, discloses various systems and methods for broadcasting live media streams. The systems enable users to, using a browser-based mixing interface, mix live media streams from participants and other content and to stream the mixed content for ingestion by content delivery networks operated by various social media sites such as Facebook, YouTube, and others. The content delivery networks ingesting the mixed content, in turn, handle the broadcasting of the content for consumption by individual viewers.

The process of content delivery, and the architecture of a content delivery network itself, can introduce significant amounts of latency. A viewer of a segment of live media content may be viewing the segment several seconds after it is has actually been produced. There are applications for which this is not a great concern, such as in the case of certain media players designed solely for playback where the viewers are simply passively watching. Such users may not mind, or even notice, any such delay that might be attributable to content delivery networks.

However, latency represents a more serious problem for other applications, such as for interactive live broadcasting applications that enable viewers to engage with a broadcast instead of merely watching it. For example, it can be very compelling for viewers to be able to send messages to performer(s) during a live broadcast and to have the performer(s) react to the messages. It can also be very compelling for viewers to be able to participate in group activities centred on a live broadcast, and/or to engage in financial transactions during a live broadcast. Facilitating engagement and interest by enabling viewers to interact with live broadcasts can build interest and loyalty. However, significant latency is a much more noticeable factor with interactive live broadcasting; viewers who wish to react notice that they are already significantly behind the performer(s), chronologically speaking. Performer(s) and the viewers being constantly and noticeably uncoordinated hampers rich interactions and can even render them practically impossible to conduct.

It is an object of the following description to address the disadvantages referred to above.

SUMMARY OF THE INVENTION

Methods, systems and arrangements are described herein for providing low-latency content delivery networks usable for widespread broadcasting of live streaming media, such as live interactive streaming media, over IP networks. Also described are methods, systems and arrangements for enabling low-latency live streaming media to be made available to a wide range of different viewer devices having various capabilities, and under various network conditions. Also provided are methods, systems and arrangements for low-latency creation of the live streaming media broadcasts.

Arrangements of such content delivery networks that can, by their architecture and operation, provide low-latency broadcasting and wider distribution, are particularly useful for supporting the deployment of various interative live media players, systems and methods of operations, such as those disclosed in co-pending PCT International Patent Application No. PCT/CA2020/051019 to Lazar et al. entitled "INTERACTIVE LIVE MEDIA SYSTEMS AND METHODS" (Lazar et al.), the contents of which are incorporated by reference herein.

In accordance with an aspect, there is provided a method of distributing live media data, the method comprising, at an intermediary server: receiving an input WebRTC stream from an upstream server; negotiating at least one quality metric with a downstream server; generating an output WebRTC stream for the downstream server, the generating comprising causing transcoding media data in the input WebRTC stream based on the at least one quality metric; and publishing the output WebRTC stream to the downstream server.

In accordance with another aspect, there is provided a network-based system for distributing live media data, comprising: an intermediary server including at least one processor configured to: receive an input WebRTC stream from an upstream server; negotiate at least one quality metric with a downstream server; generate an output WebRTC stream for the downstream server comprising causing transcoding of media data in the input WebRTC stream based on the at least one quality metric; and publish the output WebRTC stream to the downstream server.

In accordance with another aspect, there is provided a non-transitory computer readable medium embodying a computer program executable on an intermediary server for distributing live media data, the computer program comprising: computer program code for receiving an input WebRTC stream from an upstream server; computer program code for negotiating at least one quality metric with a downstream server; computer program code for generating an output WebRTC stream for the downstream server, the generating comprising causing transcoding of media data in the input WebRTC stream based on the at least one quality metric; and computer program code for publishing the output WebRTC stream to the downstream server.

In accordance with another aspect, there is provided a method of distributing live media data, the method comprising: receiving an input WebRTC stream containing media data encoded in a scalable video coding (SVC) format; broadcasting the media data to a plurality of requesting devices, the broadcasting comprising: streaming the input WebRTC stream to at least a first requesting device; receiving a request from a second requesting device for the media data in a non-SVC format; in response to the request: automatically directing a copy of the input WebRTC stream to a transcoder; in response to the automatically directing, receiving at least one modified WebRTC stream from the transcoder, each of the at least one modified WebRTC stream containing the media data encoded in the non-SVC format; and streaming at least one modified WebRTC stream to at least the second requesting device.

In accordance with another aspect, there is provided a network-based system for distributing live media data, comprising: a server including at least one processor configured to: receive an input WebRTC stream containing media data encoded in a scalable video coding (SVC) format; broadcast the media data to a plurality of requesting devices, wherein to broadcast the at least one processor is configured to: stream the input WebRTC stream to at least a first requesting device; receive a request from a second requesting device for the media data in a non-SVC format; in response to the request: automatically direct a copy of the input WebRTC stream to a transcoder; in response, receive at least one modified WebRTC stream from the transcoder, each of the at least one modified WebRTC stream containing the media data encoded in the non-SVC format; and stream at least one modified WebRTC stream to at least the second requesting device.

In accordance with another aspect, there is provided a non-transitory computer readable medium embodying a computer program executable on an intermediary server for distributing live media data, the computer program comprising: computer program code for receiving an input WebRTC stream containing media data encoded in a scalable video coding (SVC) format; computer program code for broadcasting the media data to a plurality of requesting devices, the computer program code for broadcasting comprising: computer program code for streaming the input WebRTC stream to at least a first requesting device; computer program code for receiving a request from a second requesting device for the media data in a non-SVC format; computer program code for streaming a modified WebRTC stream in response to the request, the computer program code for streaming the modified WebRTC stream comprising: computer program code for automatically directing a copy of the input WebRTC stream to a transcoder; computer program code for, in response to the automatically directing, receiving at least one modified WebRTC stream from the transcoder, each of the at least one modified WebRTC stream containing the media data encoded in the non-SVC format; and computer program code for streaming at least one modified WebRTC stream to at least the second requesting device.

In accordance with another aspect, there is provided a method of operating a live media server, the method comprising: receiving a request to route a live media stream from a first client computing device to a second client computing device; determining whether the first client computing device and the second client computing device interface with the live media server using the same public IP address; and in the event that the first client computing device and the second client computing device interface with the live media server using the same public IP address, instructing the first client computing device to stream the live media stream directly to the second client computing device, and otherwise: causing the live media server to receive the live media stream from the first client computing device; and causing the live media server to stream media data from the received live media stream to the second client computing device.

In accordance with another aspect, there is provided a live media server comprising at least one processor configured to: receive a request to route a live media stream from a first client computing device to a second client computing device; determine whether the first client computing device and the second client computing device interface with the live media server using the same public IP address; and in the event that the first client computing device and the second client computing device interface with the live media server using the same public IP address, instruct the first client computing device to stream the live media stream directly to the second client computing device, and otherwise: cause the live media server to receive the live media stream from the first client computing device; and cause the live media server to stream media data from the received live media stream to the second client computing device.

In accordance with another aspect, there is provided a non-transitory computer readable medium embodying a computer program executable on an intermediary server for operating a live media server, the computer program comprising: computer program code for receiving a request to route a live media stream from a first client computing device to a second client computing device; computer program code for determining whether the first client computing device and the second client computing device interface with the live media server using the same public IP address; and computer program code for, in the event that the first client computing device and the second client computing device interface with the live media server using the same public IP address, instructing the first client computing device to stream the live media stream directly to the second client computing device, and otherwise: causing the live media server to receive the live media stream from the first client computing device; and causing the live media server to stream media data from the received live media stream to the second client computing device.

Other aspects and advantages will be apparent upon reading the following.

BRIEF DESCRIPTION OF THE DRAWINGS

Embodiments of the invention will now be described with reference to the appended drawings in which:

FIG. 4A is a block diagram showing a modified media stream architecture usable in the live-media streaming system of FIG. 1, according to an alternative embodiment;

DETAILED DESCRIPTION

Figure 1:
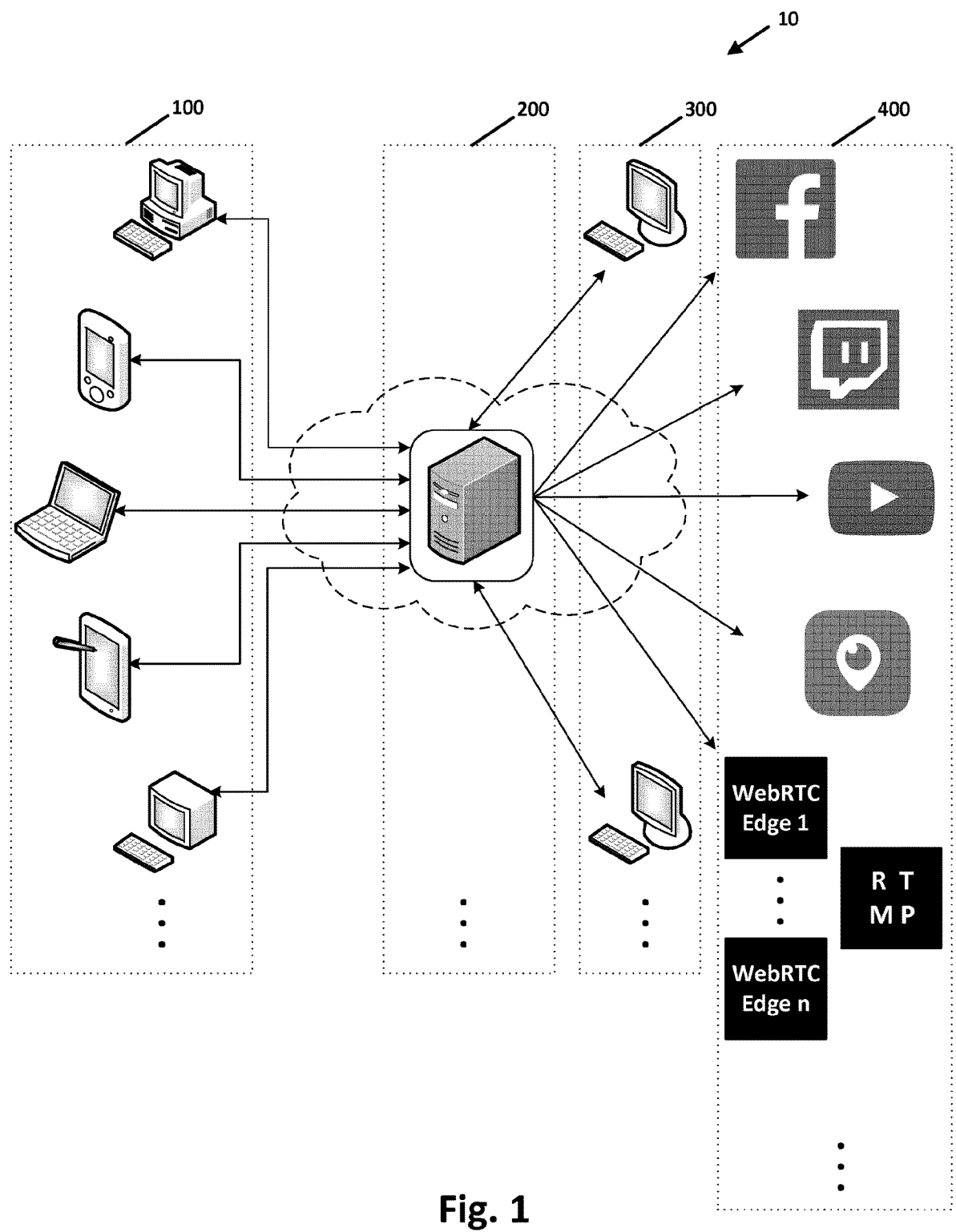
FIG. 1 is a schematic diagram showing a live media-streaming system, according to an embodiment.

FIG. 1 is a schematic diagram showing a live media-streaming system 10, according to an embodiment. In this embodiment, live media-streaming system 10 includes multiple participant computing devices 100 in communication via a network with a server system 200, and a number of director computing devices 300 in communication via the network with the server system 200. Server system 200 of live media-streaming system 10 interfaces with a number of destination computing systems 400, which are under the control of respective platform-providers, via the network according to respective schemes established by the platform providers.

Live media-streaming system 10 is operable to enable a director operating one of the director computing devices 300 to produce a high-quality live broadcast containing streaming content provided by his or her director computing device 300 and one or more participant computing devices 100 via server system 200. This high-quality live broadcast can be distributed to and by destination computing systems 400 to respective viewers in near real-time.

In this embodiment, a participant computing device 100 may be any computing device that can generate and receive audio and/or video content and that can stream such content to and from server system 200 using RTP (Real-time Transport Protocol) and/or some other mechanism for real-time communications (RTC) suitable for streaming audio and/or video media. Examples of participant computing devices 100 include a desktop computer, a smartphone, a laptop computer, a tablet computer, or another other suitable computing device. RTP in particular is a network protocol that is useful for handling the transport of audio and video streams over IP networks. RTP-deployed streams are transported over User Datagram Protocol (UDP)—one of the more foundational protocol for sending content across IP networks in packages known as datagrams. Control over the streaming of media deployed using RTP can be provided using the counterpart RTSP (Real Time Streaming Protocol) protocol, thereby to enable a receiving device or process to Play or Pause an incoming stream.

A participant computing device 100 may support a web browser that can, through the integration of particular application programming interfaces (APIs), provide access to RTC functionality through the web browser. This format of access to RTC functionality is known generally as WebRTC. Examples of such participant computing devices 100 supporting WebRTC include various computing devices that support Google's Chrome web browser, amongst others.

In this embodiment, a participant computing device 100 may alternatively be any computing device that can generate and receive audio and/or video content and that, due to supporting only a web browser that does not in turn support WebRTC, is configured instead to support operation of a non-browser application that is itself configured to implement RTP. Examples of such participant computing devices 100 are those that can be provided with non-browser applications (or "apps") configured to support RTP including computing systems configured to run iOS (Apple's mobile device operating system) on which the web browser Safari (at the time of this writing) does not support WebRTC functionality.

Furthermore, in this embodiment, a participant computing device 100 may alternatively be any computing device that can at least generate audio and/or video content and that can stream such content to server system 200 using the RTMP (Real Time Messaging Protocol) protocol. Such computing devices may be those configured as legacy studio and performer systems that can produce audio and/or video content using OBS (Open Broadcasting Software), XSplit, Livestream etc. and that can stream such content using RTMP, or webcam systems, and the like. Generally speaking, RTMP is a messaging protocol based on TCP (Transmission Control Protocol) for streaming audio, video and other data, and that is oriented to delivering the content smoothly and reliably through negotiated messaging between a client and server. RTMP is not typically used for transmission of content from mobile devices such as smartphones, as application developers focused on mobile devices have tended to choose to deploy the more wieldy and security-minded RTP-based setups. However, professional studio systems, including network-enabled camera systems and personal computing devices for controlling them, still commonly use OBS and other legacy systems with their own advantages, and thus depend on the traditional reliability of RTMP-based transport of the streaming media being produced.

As will be described in further detail below, system 10 is capable of supporting and fully integrating both WebRTC-transported streaming media and RTMP-transported streaming media from various different participant computing devices 100. This enables system 10 to be more widely deployable to ingest a wider range of content from participants/performers during media broadcasts. For example, a media broadcast may be configured to include a live conversation between multiple participants by simultaneously integrating live-streams from the participants' computing devices 100, each located in respective geographical locations, without having to have a camera-operator at each location and without requiring the participants to travel to a professionally operated studio. Furthermore, as will be described, system 10 can be effectively deployed by studio operators without using up studio space while, with high quality, high-flexibility and at reasonable cost, extending their ability to produce professional-level content beyond their immediate bricks-and-mortar capabilities. Furthermore, the integration capabilities are powerful for enabling show producers to draw on, manipulate, combine and deploy content from a wide variety of participants and content sources in order to produce shows that are maximally creative, informative and effective.

In this embodiment server system 200 is one or more individual servers operating as either virtual machines or physical machines, within either a cloud-based configuration or a more fixed-location configuration.

In this embodiment, a director computing device 300 may be any computing device that can generate and receive audio and/or video content and that can stream such content to and from server system 200 using RTC, such as WebRTC, and that can handle the processing, manipulation and transport of multiple audio and/or video streams to and from server system 200. Examples of suitable director computing devices are those with sufficient processing power, storage and operating memory to handle the multiple media streams without unduly degrading the quality being produced and transported downstream, such as a suitably-equipped desktop computer or laptop computer. In this embodiment, a director computing device 300 supports operating of a web browser that can supports WebRTC, such as Google's Chrome web browser.

In this embodiment, numerous destination computing systems 400 with which server system 200 can interface include social network and other live broadcasting computing systems, each comprising respective individual or networks of computing devices and offering interfaces for receiving and handling live media streams over RTMP or WebRTC. In this embodiment, the particular destination computing systems 400 shown that receive live media streams over RTMP are Facebook Live, Twitch, YouTube Live, and Periscope. As would generally be known, Facebook Live (https://live.fb.com) is a platform offered by social network provider Facebook for enabling live streaming to timelines on the social network. Twitch (https://www.twitch.tv/) is a platform primarily oriented to the broadcast of live media streams featuring video games and their players, as well as the handling of conversation threads for fans and players alike. YouTube Live (https://www.youtube.com) is a platform also used for broadcast of live media streams such as interviews, documentaries and the like. Periscope (https://www.pscp.tv) is a platform primarily oriented at publicly sharing live media streams captured from mobile devices for consumption by users accessing the site. For reliable handling, these destination computing systems 400A-D have traditionally required that content providers, such as system 10, transport their live media streams using RTMP.

In this embodiment, the particular destination computing system 400 shown that receives live media streams over WebRTC is an individual WebRTC edge server 400E, or multiple such WebRTC edge servers 400E1, 400E2, . . . , 400En. An individual WebRTC edge server 400E is intended to be physically closer than server system 200 to the viewers V in a geographical region who wish to receive (and, in embodiments as will be described, interact with) a live broadcast. In this way, viewers V in that region are able to receive their WebRTC streams directly from the proximate WebRTC edge server 400E, rather than having to receive the streams from what might be a more remotely located server system 200. For example, server system 200 might be physically located in Palo Alto, California, U.S.A., whereas a WebRTC edge server 400E1 is deliberately located in New York City, New York, U.S.A. With this architecture and geographical placement, if a number of viewers V desiring the live stream are physically located closer on the Internet to the first WebRTC edge server 400E1, their initial requests to the server system 200 to receive the live stream are re-directed to the first WebRTC edge server 400E1. In this way, the server system 200 is not required to serve those remotely located viewers V. Rather, the server system 200 sends one high-quality WebRTC stream to the WebRTC edge server 400E1, and the WebRTC edge server 400E1, in turn, restreams to the locally proximate viewers.

Similarly, is a number of viewers V desiring the live stream are physically located closer on the Internet to the second WebRTC edge server 400E2, their initial requests to the server system 200 to receive the live stream are soon re-directed to the second WebRTC edge server 400E2. In this way, the server system 200 is not required to serve that same number of live streams all the way across the World via the Internet to serve those remotely located viewers V. Rather, the server system 200 sends one high-quality WebRTC stream to the WebRTC edge server 400E2, and the WebRTC edge server 400E2, in turn, restreams to the locally proximate viewers.

As will be described herein, the WebRTC edge server may receive a live media stream of a very high quality (such as 1080p at an appropriate bitrate), but may itself modify the media content to help manage quality of service (QoS) at the local level. For example, a given computing device operated by a given viewer V may only be able to negotiate with its corresponding WebRTC edge server 400E to receive content at 720p due to local network conditions or device capabilities. This, despite the WebRTC edge server 400E having a higher resolution stream available for serving other viewers V whose local network conditions and/or device capabilities are better. By distributing the processing required to handle transcoding to WebRTC edge servers 400E, the local QoS needs can be met without the director computing device 300 having itself been required to produce the various versions of the media content to be streamed, or necessarily to have produced a scalable video coded (SVC) stream such as VP9 at 1080p. Furthermore, individual devices that are not capable of decoding SVC content, or that operate using different audio and video codecs than those used to encode the original broadcast stream, can be served with appropriately transcoded content as negotiated locally with the WebRTC edge server 400E.

In this embodiment, WebRTC edge server(s) 400E is/are considered somewhat of an extension of server system 200 itself, as they are under the control of the same entity that controls server system 200. However, in other embodiments, the or all or some WebRTC edge server(s) 400E may be operated by a different entity that specializes in providing edge access to content, and that can cooperate with server system 200 to handle local distribution of the live streams in the manner discussed above. For this reason, and for the reason that it is useful to geographically distance WebRTC edge servers 400E from server system 200, in this description the WebRTC edge servers 400E are depicted as machines, or clusters of machines, that are separate from server system 200. It will be appreciated that a given WebRTC edge server 400E may be physically located near to server system 200 to handle even local redistribution, rather than requiring server system 200 itself to do this.

In this embodiment, a given live stream is not directed via WebRTC to a given WebRTC edge server 400E unless at least one viewer local to the WebRTC edge server 400E has requested the live stream. This is because it may be that a given live stream is not of interest to viewers in many parts of the World, such that streaming it far and wide to WebRTC edge servers 400E in various places would have not utility and could occupy bandwidth useful for other, more locally-interesting, streams. As such, only in the event that a viewer in a particular part of the World has requested access to the live stream is a WebRTC stream caused to be directed to that viewer's local WebRTC edge server 400E for that viewer to consume. In an embodiment, server system 200 and a given WebRTC edge server will be configured such that a particular WebRTC stream is only directed to that WebRTC edge server 400E under certain different threshold conditions. For example, if quality of service (QoS) is diminishing when viewers are directly accessing server system 200, server system 200 and a WebRTC edge server 400E may cooperate to improve QoS by sending the particular WebRTC live stream to a WebRTC edge pool of a WebRTC edge server 400E so that the viewers are handed-off; that is, so that they may instead receive the WebRTC live stream from the local WebRTC edge server 400E.

In a similar manner, a given WebRTC stream may not be directed to a WebRTC edge server 400E until a threshold number of viewers V in the corresponding geographical location has requested it. In the example given above, the threshold number of requesting viewers V is one (1), but this threshold may be raised. For example, server system 200 may have a threshold set at ten (10) viewers V, such that it will direct the WebRTC live stream to a WebRTC edge server 400E only in the event that the number of requesting viewers corresponding to the location of the WebRTC edge server exceeds ten (10) viewers.

Figure 1A:
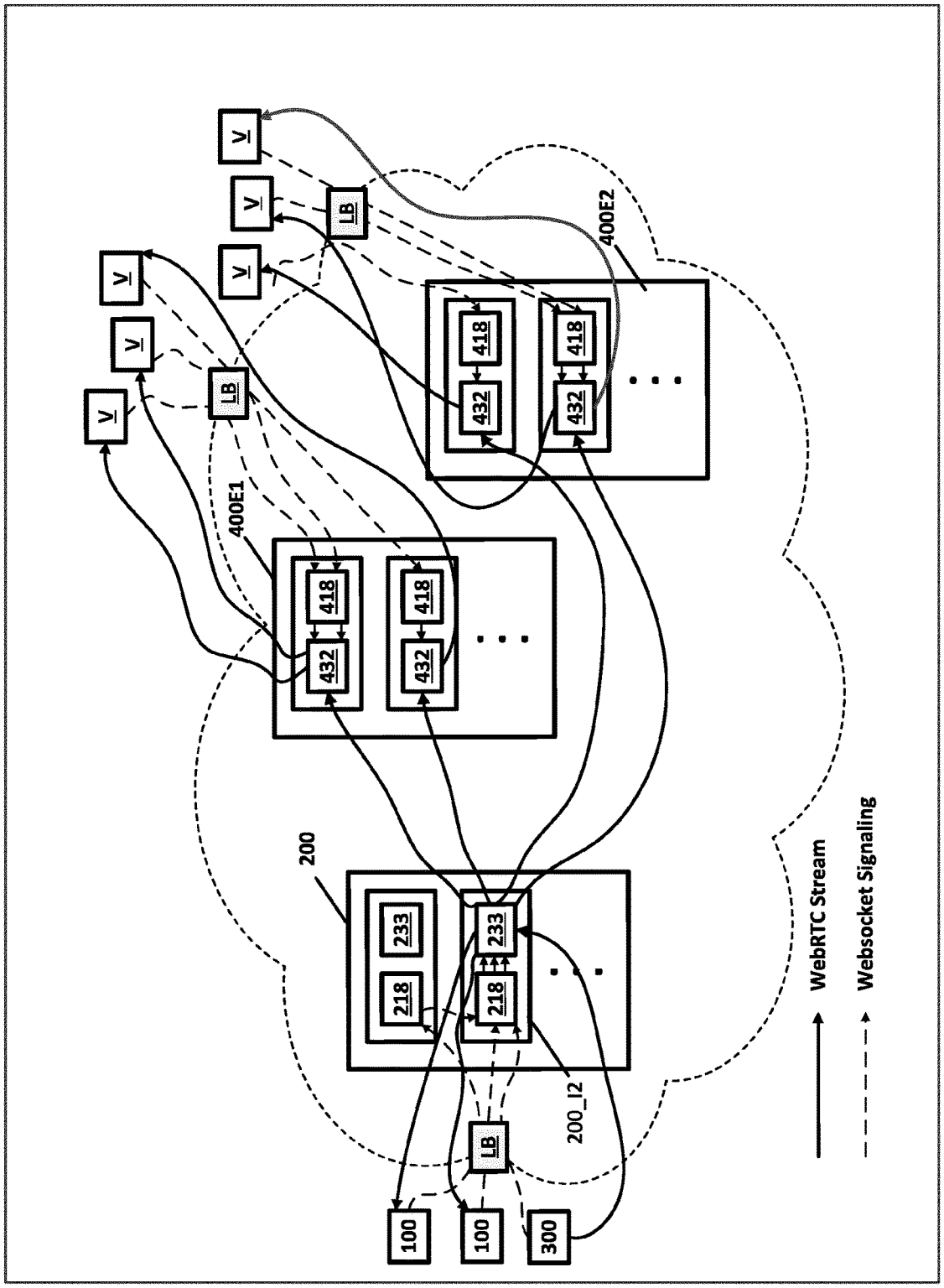
FIG. 1A is a schematic diagram showing a content delivery network arrangement for distributing live media-streaming to various geographic locations using WebRTC, according to an embodiment.

FIG. 1A is a schematic diagram showing a content delivery network arrangement for distributing live media streaming to various geographic locations using WebRTC, according to an embodiment. In this embodiment, a server system 200 serves as a WebRTC origin and incorporates multiple WebRTC origin pools. Each of the WebRTC origin pools can stream multiple WebRTC live streams to multiple respective WebRTC edge pools in multiple WebRTC edge servers 400E. In this example, server system 200 is located in a US West region, WebRTC edge server 400E1 is located in a US East region, and WebRTC edge server 400E2 is located in an Asian region. It will be appreciated that additional WebRTC edge servers 400E may be located at the same and/or in different regions of the World, and that each WebRTC edge server 400E may have fewer or greater respective WebRTC edge pools than shown, and than each other.

As will be described in further detail below, for a given production or show being created by a user using a director computing device such as director computing device 300, server system 200 communicates with participant computing devices 100 and with the director computing device 300 via a load balancer LB to direct live media streams to director computing device 300 for mixing together and, as desired, other content. A Janus gateway 232 in each of the WebRTC origin pools communicates with participant computing devices 100 and with director computing device 300 to maintain connections and to coordinate communications as between the director and the participants during a live broadcast. The media that is mixed at director computing device 300 is streamed from the director computing device 300 to a corresponding Janus core 233 of a WebRTC gateway for, in turn, streaming as a WebRTC stream to a computing device that is outside of the server system 200. Such a computing device to which the broadcast-ready WebRTC is directed may be viewer device V.

However, as shown in FIG. 1A, such a computing device may be a WebRTC edge server 400E, such as WebRTC edge servers 400E1 (US East) and 400E2 (Asia). For ease of understanding, in FIG. 1A, only a single broadcast is shown being created at server system 200. However, two copies of the broadcast-ready WebRTC live media stream resulting from the mixing at the director computing device 300 are being directed by the Janus core 233 to WebRTC edge servers 400E1, and two copies are being directed to WebRTC edge server 400E2. A different WebRTC edge pool in each of the WebRTC edge servers 400E1 and 400E2 is receiving and handling a respective copy of the WebRTC stream. In particular, each pool employs a manager 418 for handling requests and communications with individual computing devices of viewers V, and a Janus WebRTC gateway 432 for distributing WebRTC content. The WebRTC edge pools independently handle re-distribution of their respective incoming WebRTC streams to the computing devices of requesting viewers V. A load balancer LB for each WebRTC edge server 400E1, 400E2 handles the directing of requests from computing devices of requesting viewers V to respective WebRTC edge pools thereby to manage the balance of resources. If the number of viewers V making requests for content from server system 200 increases beyond a threshold, a WebRTC edge server 400E can instantiate an additional WebRTC edge pool, request that an additional WebRTC live stream be directed to it, inform the load balancer it is available for viewers V, and begin distributing content to the additional viewers V.

In order to configure a given WebRTC edge pool to handle serving many thousands of viewers V, the threading of the WebRTC edge servers 400E and the WebRTC edge pools themselves are optimized for redistribution. This optimization is different from, for example, the WebRTC origin, which is, optimized for content generation itself and any back-and-forth streaming of content and messaging with participant computing devices 100. It will be appreciated that the number of viewers V that can be associated with a particular WebRTC edge pool will depend on the load incurred by particular content, since some live streams will contain more data than other live streams. However, optimization is directed towards achieving thousands of viewers V per WebRTC edge pool and, depending on optimization and the content, up to and exceeding 100,000 viewers per WebRTC edge pool. As demand for content from a particular WebRTC edge server 400E increases to a point where it is anticipated that additional resources will be needed to maintain QoS, additional WebRTC edge pools can be automatically or manually instantiated on the same or other WebRTC edge servers 400E in a local cluster to share the load.

While, in FIG. 1A, only a single WebRTC edge server 400E lies between a viewer V and server system 200, in alternative implementations involving large geographical distances, more than one WebRTC edge server 400E may be deployed to help keep higher volumes of requests for, and streaming of, content to be done locally rather than across the World.

As shown in FIG. 1A, the load balancer LB may direct a participant computing device 100 that is part of a given broadcast to have its communications and incoming live media stream ingested by a different WebRTC origin pool. For this purpose, a given floor manager process 218 and Janus core 233 of one WebRTC origin pool is able to ingest content from a different WebRTC origin pool in server system 200 that has, itself, ingested the live media stream from the participant computing device 100. In FIG. 1A, content from the uppermost participant computing device 100 is being directed by the load balancer LB to the uppermost WebRTC origin pool. The next WebRTC origin pool is ingesting the content for part of the same production as the other participant computing device 100 and the director computing device 300.

Figure 1B:
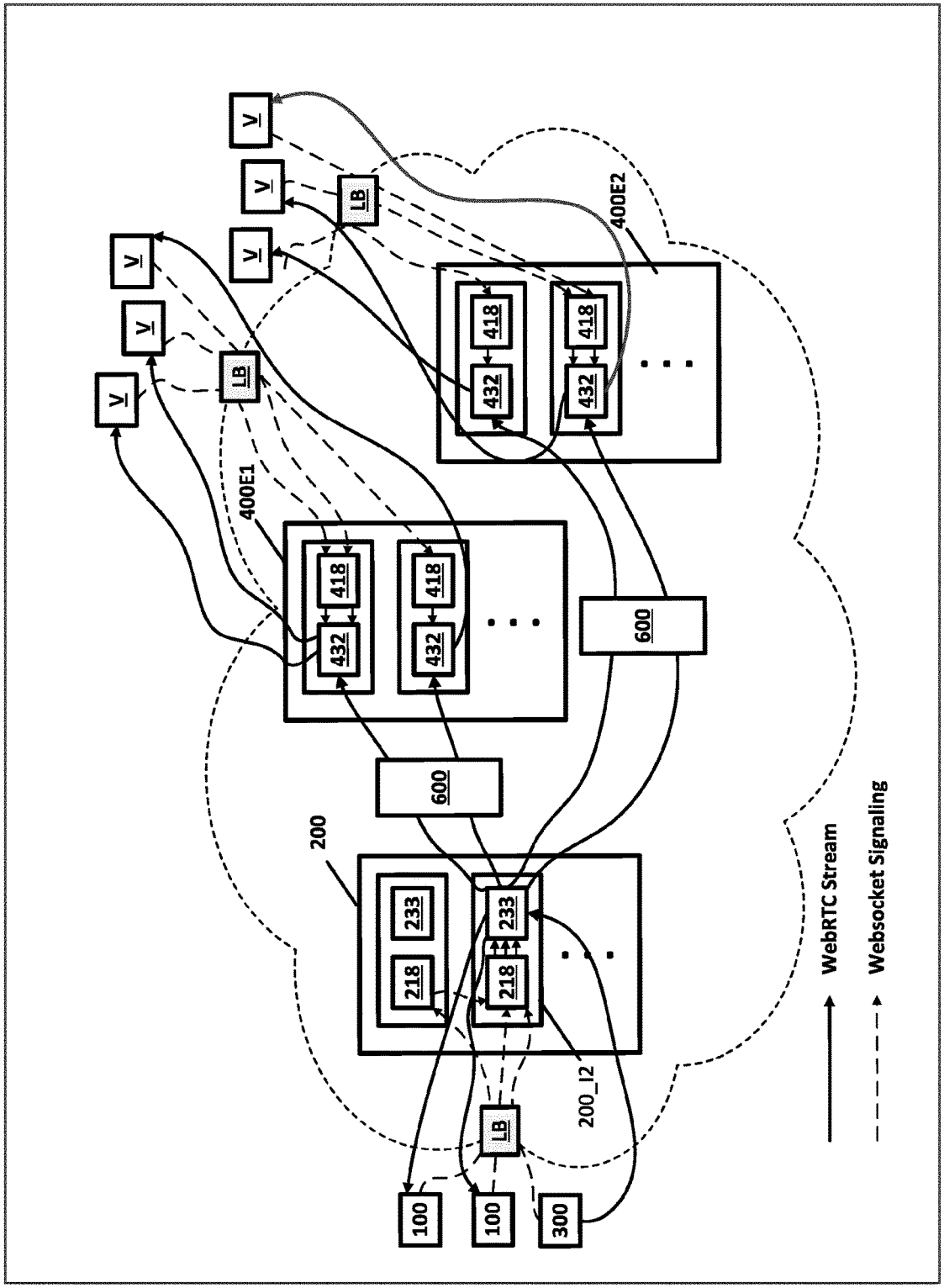
FIG. 1B is a schematic diagram showing a content delivery network arrangement for distributing live media-streaming to various geographic locations using WebRTC, where the content delivery network includes intermediary servers dedicated to transcoding, according to another embodiment.

FIG. 1B is a schematic diagram showing a content delivery network arrangement for distributing live media-streaming to various geographic locations using WebRTC, where the content delivery network includes intermediary servers 600 dedicated to transcoding, according to an another embodiment. While individual intermediary servers 600 are shown for ease of illustration, a given implementation may involve deployment of multiple networked computing devices with load balancing.

Each intermediary server 600 is implicated in the distribution of media data traversing the content distribution network, as it receives input WebRTC streams from an upstream server such as server system 200, negotiates at least one quality metric with a downstream server such as WebRTC edge server 400E, and generates corresponding output WebRTC streams for the downstream server at least by transcoding media data in respective input WebRTC streams based on the at least one quality metric. The output WebRTC streams are then published to the downstream server.

The intermediary servers 600 are deployed at geographical locations that are closer to the downstream servers they can conduct transcoding for than are the upstream servers from which they receive their input WebRTC streams. The placement of, and the transcoding done by, the intermediary servers 600 is useful for controlling QoS to viewers V. In particular, if a particular WebRTC stream exiting server system 200 and destined for a remote WebRTC edge server 400E for further distribution to viewers V encounters a poor network connection through its long traverse, it may be unable to maintain a given QoS. For example, a long connection between geographically-remote locations such as US East and Korea may perform poorly or be unpredictable such that 1080p video may work well at one time but not another. Furthermore, distributing live media using RTSP as an alternative to WebRTC may not be a useful solution because RTSP does not offer dynamic bit rates or QoS to deal with the unpredictability.

It is known to stream scalable video encoded (SVC) content, such as by using VP9 encoding, so that the downstream server is able to dynamically select the decoding resolution based on available bitrate and adjust the display resolution accordingly for a given stream. In this way, the downstream server can somewhat adapt automatically to unreliable connections extending over long distances. Alternatively, it may be possible for the server system 200 itself to generate individual non-SVC versions of the content to stream to the remote location, so that the versions can be made available directly from the server system 200. However, the Janus gateway 232 does not itself support transcoding, and it can be difficult to configure FFmpeg/Gstreamer solutions to transcode WebRTC content while supporting WebRTC advanced features. Furthermore, neither of these solutions provide intermediary servers such as servers 600 to assist with stream transport across long distances.

In this embodiment, each intermediary server 600 is a dedicated browser-based transcoding computing device used to connect two Janus servers that are in different regions. In this embodiment, each intermediary server 600 is a headless Chromium device, having application logic coded in JavaScript and controlled using an orchestration API server (not shown). It will be appreciated that Chromium (whether headless or not) provide innovative WebRTC functionality with a JavaScript layer. Alternatives such as Firefox-based and Chrome-based non-headless devices may be deployed for software decoding. Still further, an intermediary server 600 may implement hardware encoding/decoding using locally deployed individual or clusters of Raspberry Pi machines and/or more massive CPU-based datacenter CPU systems in the cloud, such as Xeon or others.

Figure 1C:
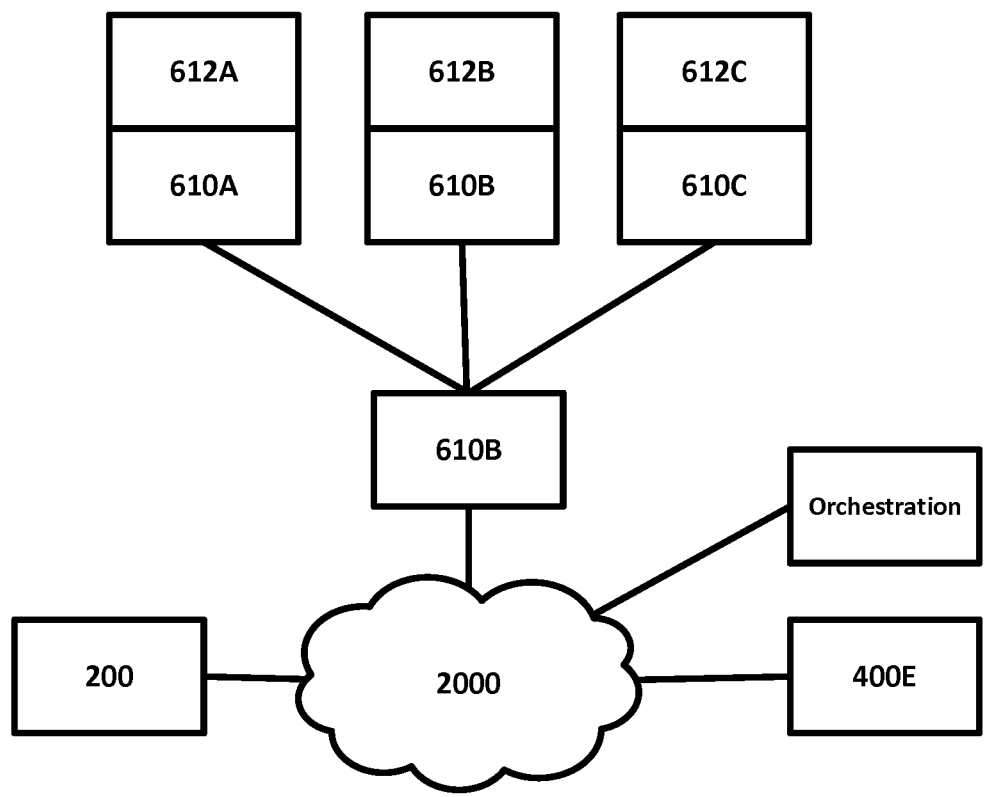
FIG. 1C is a schematic diagram showing the topology of a cluster of Raspberry Pi machines each executing a Chromium browser over Linux for implementing an intermediate server dedicated to transcoding, according to an embodiment.

FIG. 1C is a schematic diagram showing the topology of a cluster of Raspberry Pi machines 610A, 610B, 610C each executing a Chromium browser 612A, 612B, 612C over Linux, according to an embodiment. In this embodiment, each of three Chromium browsers 612A-C is executing at least one tab that can respectively run JavaScript code for transcoding up to 20 WebRTC streams, depending on the resolution being received and required for output. An Ethernet switch and router 620 connected to the Internet via a fiber optic modem route media and orchestration data from and to an upstream Janus-based server system 200 and a downstream Janus-based WebRTC edge server 400E.

The intermediary server 600 accepts video as WebRTC at the highest bitrate offered from the server system 200, or at least the highest bitrate allowed to maintain a given QoS as between the intermediary server 600 and the server system 200. The intermediary server 600 transcodes the WebRTC content, and then publishes the transcoded content to the downstream WebRTC edge server 400E at the highest quality that the downstream WebRTC edge server has requested/negotiated with the intermediary server 200. By locating the intermediary server 600 at a physical location that is closer to the downstream server than is the upstream server, intermediary server 600 can contribute to the maintenance of quality and the provision of dynamic bitrates at a more local level.

In embodiments, an intermediary server 600 requests a particular input WebRTC stream from an upstream server only in response to receiving a request from the downstream server for the content.

Transcoding by an intermediary server 600 can be done in various ways. For example, transcoding may include decoding media data in an input WebRTC stream and re-encoding the decoded media data at a lower bitrate and/or resolution.

It will be appreciated that the intermediary server 600 may be configured to adapt to network conditions by conducting the negotiating of quality metrics, generating transcoded content to accord with the QoS, and publishing for a given input WebRTC stream multiple times. The quality metrics may be one or more of time to first frame, error rate, buffer time, average bitrate, and resolution.

Intermediary server 600 may be implemented just as a WebRTC edge server 400E, thereby to provide edge services as well as the functionality described above.

A given intermediary server 600 may be caused to be instantiated remotely by server system 200 or by an orchestration process in response to changes in network conditions thereby to maintain QoS to acceptable levels.

Figure 1D:
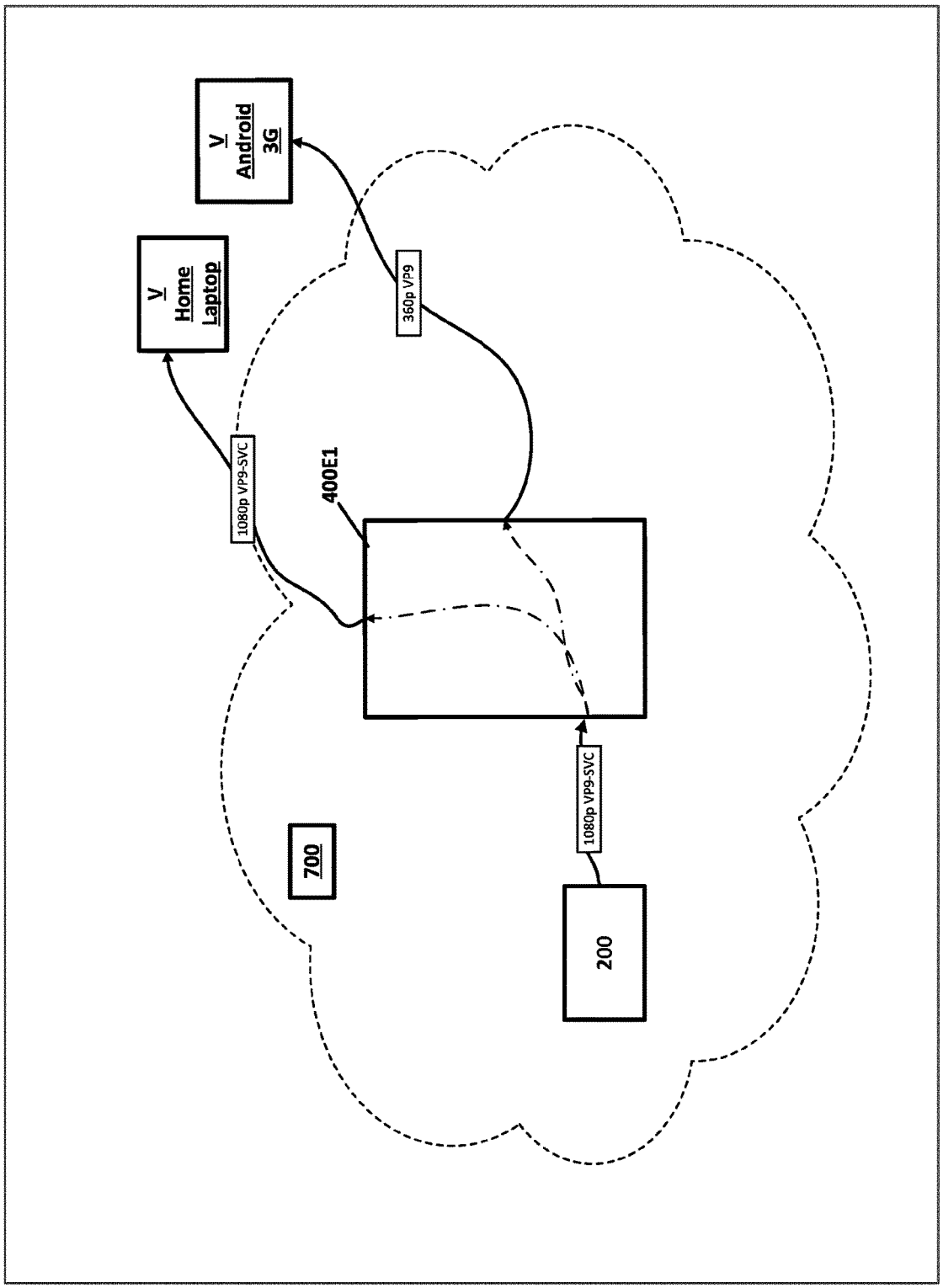
FIG. 1D is a schematic diagram showing a content delivery network arrangement for distributing live media-streaming to various devices from a WebRTC edge server, where the content delivery network includes an auxiliary server available for transcoding, according to another embodiment.

FIG. 1D is a schematic diagram showing a content delivery network arrangement for distributing live media streaming to various devices from a WebRTC edge server 400E, where the content delivery network includes an auxiliary server 700 available for transcoding, according to an embodiment. The arrangement of FIG. 1D can be useful in situations where the WebRTC stream being received by the WebRTC edge server 400A is encoded in a format that is not necessarily supported by local computing devices that are requesting content. In FIG. 1D, server system 200 is streaming a high quality, 1080p VP9-SVC coded stream over WebRTC to WebRTC edge server 400E. This high-quality stream is made available to local computing devices, including a laptop computing device that receives a copy of the VP9-SVC coded stream and decodes it at 1080p, and an Android 3G device that receives content at 360p. It will be appreciated that VP9-SVC encoded content does not need transcoding in the same manner as other encoded content, because it contains multiple resolutions in a single stream.

However, certain devices, such as iOS devices, are not (at the time of this application) compatible with VP9-SVC or with other scalable video coding (SVC) schemes. An iOS device supports VP8 and H.264, with VP8 only being decodable in software and H.264 only being decodable in hardware. Furthermore, while H.264 is reliable at 720p resolution, it becomes less reliable at 1080p, and performs poorly at 4K.

While different WebRTC streams having different resolutions and/or encoding formats could be produced (using H.264, for example) by a director computing device 300 for broadcasting and streamed in parallel to WebRTC edge server 600, this causes the director computing device 300 to use more processing power and uploading bandwidth than may be desirable or available.

Transcoding in the cloud tends to require complex FFmpeg/Gstreamer pipelines, which themselves are difficult to keep current as hardware decoding, encoding, and WebRTC adapt. Furthermore, FFmpeg/Gstreamer pipelines are challenging to optimize for latency and QoS, and they tend not to be easy to adapt well to CPU/network bottlenecks.

The use of an auxiliary server 700 for transcoding enables the content delivery network to meet demand and to adapt in the event that a particular performer wishes to stream content at very high levels. In an embodiment, the ability for a performer to have such content streamed at a high quality across the content delivery network to as many different kinds of devices as possible is offered as a premium feature. As such, when a performer elects to broadcast WebRTC content, the VP9-SVC output is enabled at the server system 200 thereby to support streaming of multi-bitrate encoded media content. This stream can be, as described above, propagated throughout the content delivery network to WebRTC edge servers 400E at the maximum resolution/bitrate that the WebRTC edge servers 400E can receive, to be available at the edge for individual viewers V. In this way, viewers V whose devices support VP9-SVC can also retrieve the highest quality media content available at the edge, and that suits their individual bandwidth and device capabilities. Those users whose computing devices do not support VP9-SVC, however, can still access the content due to the availability of auxiliary server 700.

FIG. 1 is a schematic diagram showing the content delivery network arrangement of FIG. 1D, with the auxiliary server 700 being used by the WebRTC edge server 400E to transcode media content in response to demand from a viewer requiring different coding from that received by the WebRTC edge server 400E. In this diagram, an iOS device that does not support VP9-SVC is requesting the live stream from server system 200, and is being referred to WebRTC edge server 400E to receive the stream. Since the iOS device cannot work with VP9-SVC, WebRTC edge server 400E refers the 1080p VP9-SVC WebRTC stream out to auxiliary server 700 for transcoding. In response, auxiliary server transcodes the media content and returns 720p, H.264-encoded media content to WebRTC edge server 400E over WebRTC. In turn, WebRTC edge server 400E forwards this 720p, H.264 encoded media content to the iOS device, as well as to any other local devices that need or want to receive this WebRTC stream instead of the SVC stream.

Auxiliary server 700 may be capable of, and instructed to, transcoding to alternative formats, or to multiple parallel formats to meet demand. For example, in response to receiving a single 1080p, VP9-SVC encoded stream, auxiliary server may return a 720p, H.264-encoded stream as well as a 360p, H.264 encoded stream and/or a 140p, H.264 encoded stream.

In this embodiment, auxiliary server 700 being dedicated to transcoding can handle multiple transcoding sessions at once.

In this embodiment, each auxiliary server 700 is a dedicated browser-based transcoding computing device. In this embodiment, each auxiliary server 700 is a headless Chromium device, having application logic coded in JavaScript and controlled using an orchestration API server (not shown). It will be appreciated that Chromium (whether headless or not) provides innovative WebRTC functionality with a JavaScript layer. Alternatives such as Firefox-based and Chrome-based non-headless devices may be deployed for software decoding. Still further, an auxiliary server 700 may implement hardware encoding/decoding using locally deployed individual or clusters of Raspberry Pi machines and/or more massive CPU-based datacenter CPU systems in the cloud, such as Xeon or others.

If auxiliary server 700 is not fully loaded with transcoding sessions, incoming VP9-SVC streams can be ingested at 1080p for transcoding. However, in the event that an auxiliary server 700 approaches processing and bandwidth limits, it can revert to ingesting the or a portion of the VP9-SVC streams it is transcoding at lower resolutions (such as 720p, 360p, 144p), and returning H.264 encoded streams over WebRTC with accordingly lower resolutions.

This ingestion flexibility enables an auxiliary server 700 to continue to stream content while an orchestration server (not shown) instantiates new transcoding processes or individual servers to adapt to the increasing load. This may be done while a live broadcast is happening, such that for a first duration of the broadcasting the SVC-coded content may be decoded at a particular resolution and returned accordingly, and for at least a second duration of the broadcasting the SVC-coded content is decoded at a particular different resolution and returned accordingly.

It will be appreciated that, since the auxiliary server 700 publishes the transcoded stream back to the WebRTC edge server 400E (or any other server requesting the transcoding), auxiliary server 700 is only required to transcode one copy of the VP9-SVC stream to H.264 per show despite there potentially being thousands of viewers needing the H.264 encoded stream.

Figure 1E:
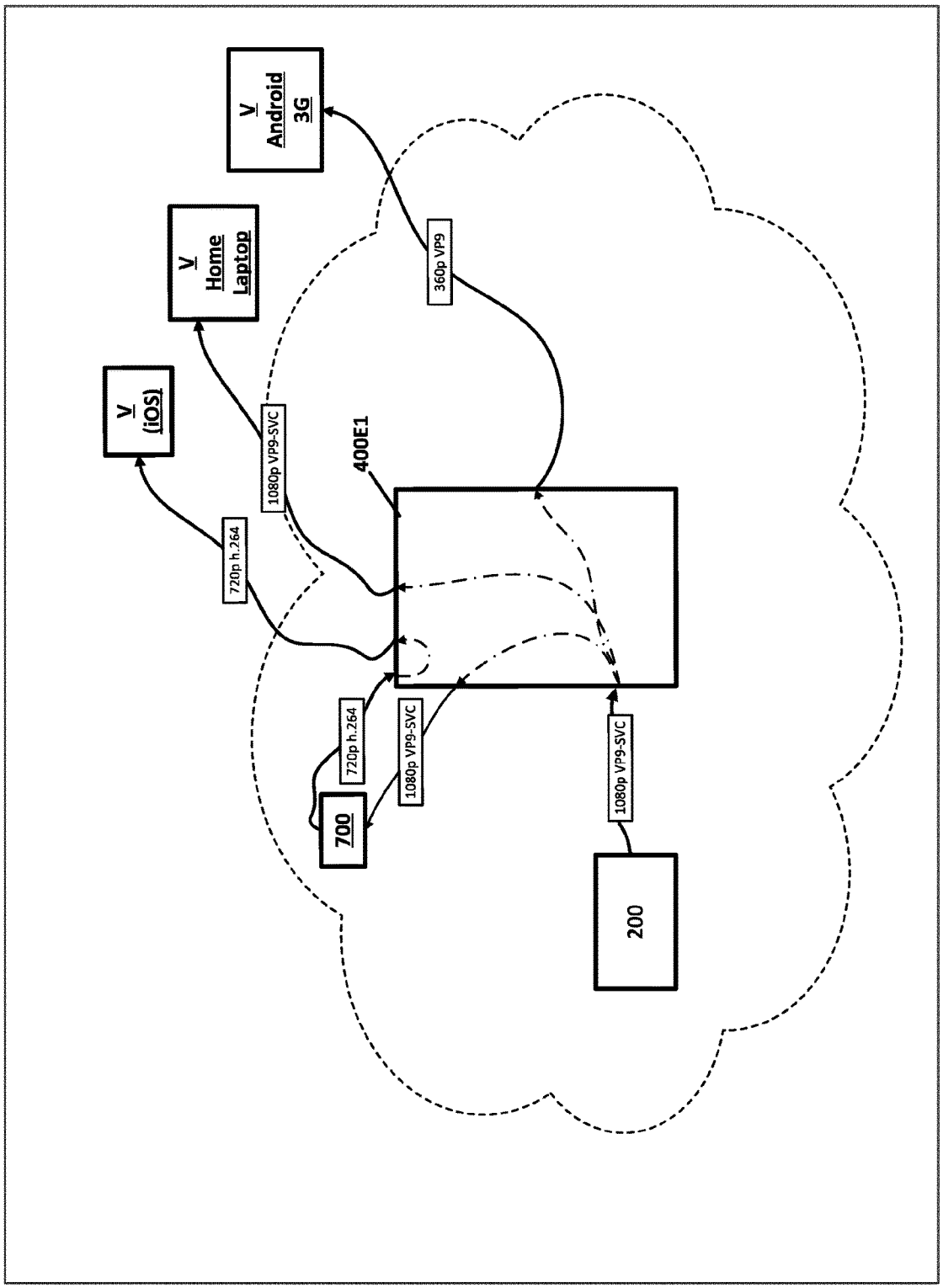
FIG. 1E is a schematic diagram showing the content delivery network arrangement of FIG. 1D, with the auxiliary server being used by the WebRTC edge server to transcode media content in response to demand from a viewer requiring different coding from that received by the WebRTC edge server.

While the transcoded stream is shown in FIG. 1E as being directed to a viewer device, it will be appreciated that the transcoded stream may be broadcast to multiple viewer devices, either directly or via another WebRTC edge server 400E over WebRTC.

While VP9 is the example SVC encoding format, WebRTC streams carrying other SVC encoding formats may be forwarded to an appropriately equipped auxiliary server 700.

Figure 1F:
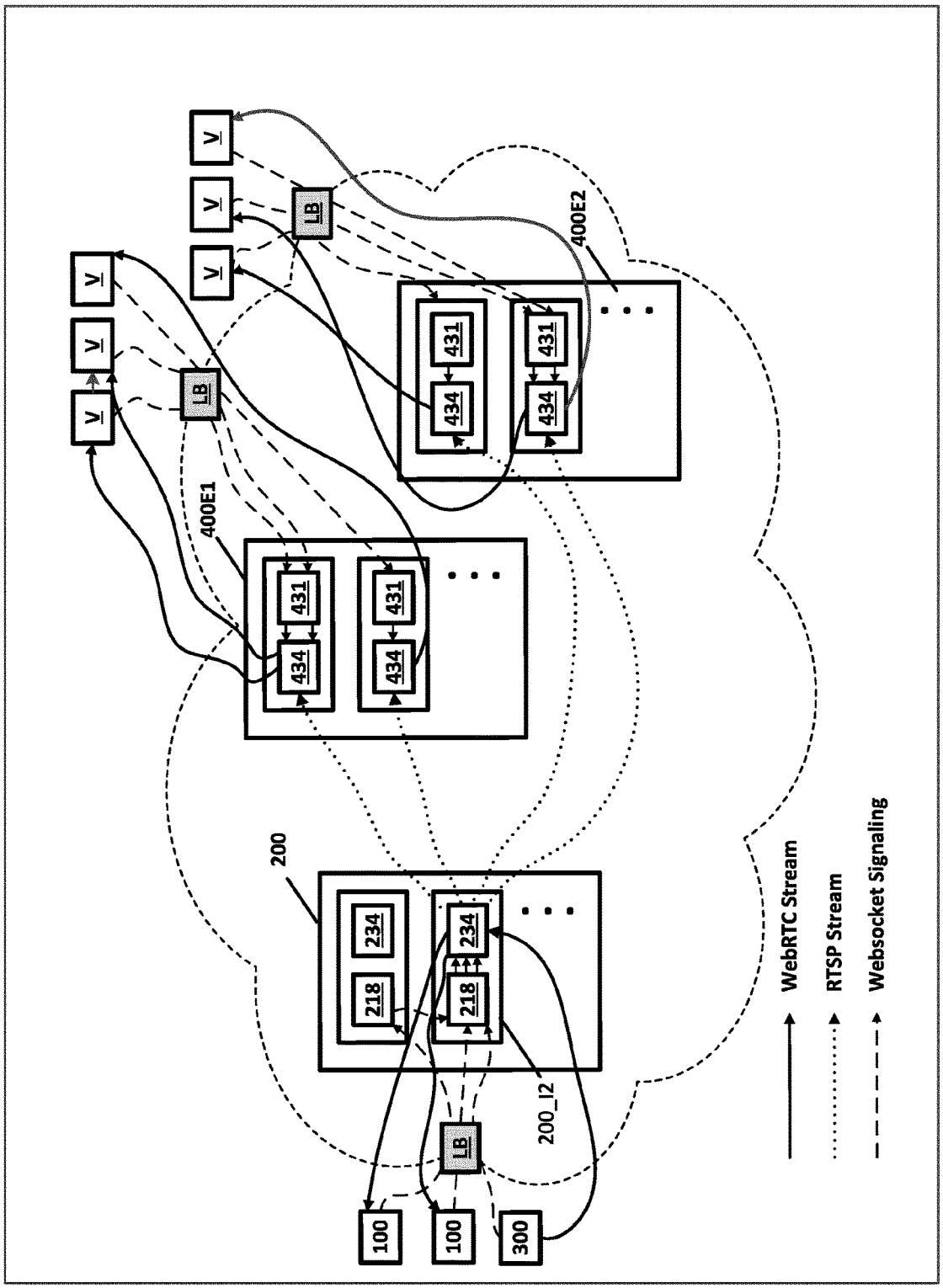
FIG. 1F is a schematic diagram showing a content delivery network arrangement for distributing live media-streaming to various geographic locations using RTSP, according to another embodiment.

Portions of the origin-edge architectures exemplified in FIG. 1A or 1B may be implemented in other ways. For example, FIG. 1F is a schematic diagram showing a content delivery network arrangement for distributing live media streaming to various geographic locations using RTSP, according to another embodiment. In this embodiment, as will be described in further detail below, a Janus RTSP plugin 234 in each WebRTC origin pool distributes content using RTSP to downstream WebRTC edge servers 400E1. Each WebRTC edge pool receiving a respective RTSP media stream from server system 200 ingests the RTSP stream and, using a corresponding Janus RTSP plugin 434 causes the media content in the RTSP stream to be redistributed as WebRTC live streams to respective viewers V. Alternatives are possible.

Figure 2:
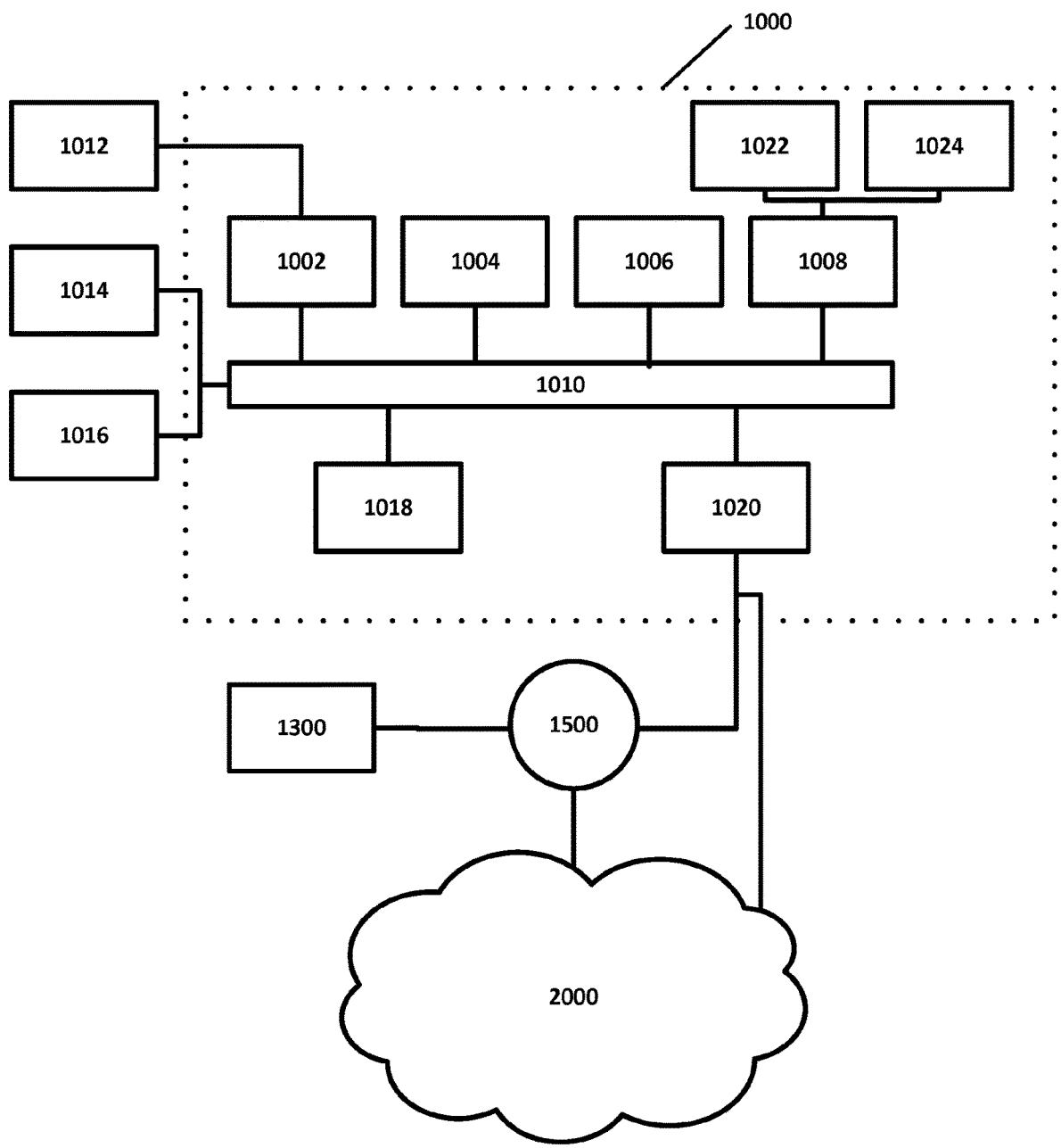
FIG. 2 is a schematic diagram showing a hardware architecture of a computing system suitable as a hardware platform for one or more components of the live media-streaming system of FIG. 1, according to an embodiment.

FIG. 2 is a schematic diagram showing a hardware architecture of a computing system 1000. Computing system 1000 is suitable as the hardware platform for any individual computing device 100, any individual servers in the server system 200, any individual director computing device 300, and any of the WebRTC edge servers 400E. Computing system 1000 may also be suitable as the hardware platform for other ones of the individual destination computing systems 400A-D. It will be understood that, due to there being well-defined schemas for interfacing with individual destination computing systems 400A-D for the purposes of this description, specific underlying hardware architectures of any of the destination computing systems 400A-D is outside the scope of the present description.

A particular computing system 1000 may be specially configured with software applications and hardware components to enable a user to author, edit and play media such as digital audio and video, as well as to encode, decode and/or transcode the media from and into various formats such as MP4, AVI, MOV, WEBM, H.264, H.265, VP8, VP9, Opus, MP3 and the like and according to various selected parameters, thereby to compress, decompress, view and/or manipulate the digital audio and video as desired for a particular application, media player, or platform. Computing system 1000 may also be configured to enable an author or editor to form multiple copies of a particular digital video, each encoded with a respective bitrate, to facilitate streaming of the same digital video to various downstream users who may have different or time-varying capacities to stream it through adaptive bitrate streaming.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user (e.g., for controlling mixing of live-streams of audio and video and other media). Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Computing system 1000 may be provisioned with or be in communication with live broadcast/streaming equipment that receives and transmits, in near real-time, a stream of digital video/audio content captured in near real-time from a particular live event, performer or participant.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

A computing device appropriate for playback of a given media stream transported to destination computing systems 400 may take any of a number of forms, including a suitably-provisioned computing system such as computing system 1000, or some other computing system with a similar or related architecture. For example, the media player computing system may process the digital video for playback using a central processing unit (CPU) or both a CPU and a GPU, if appropriately equipped, or may be a hardware-based decoder. A media player computing system including a GPU may support an abstracted application-programming interface such as OpenGL for use by a media player application running on the computing system to instruct the graphics-processing unit of the media player computing system to conduct various graphics-intensive or otherwise parallel operations. The media player may take the form of a desktop or laptop computer, a smartphone or other mobile device, virtual reality headgear, or some other suitably provisioned and configured computing device.

Various forms of computing device could be employed to play back audio and video content in particular, such as head mounted displays, augmented reality devices, holographic displays, input/display devices that can interpret hand and face gestures using machine vision as well as head movements through various sensors, devices that can react to voice commands and those that provide haptic feedback, surround sound audio and/or are wearables. Such devices may be capable of eye-tracking and of detecting and receiving neural signals that register brain waves, and/or other biometric signals as inputs that can be used to control visual and aural representations of audio and video content.

Figure 3:
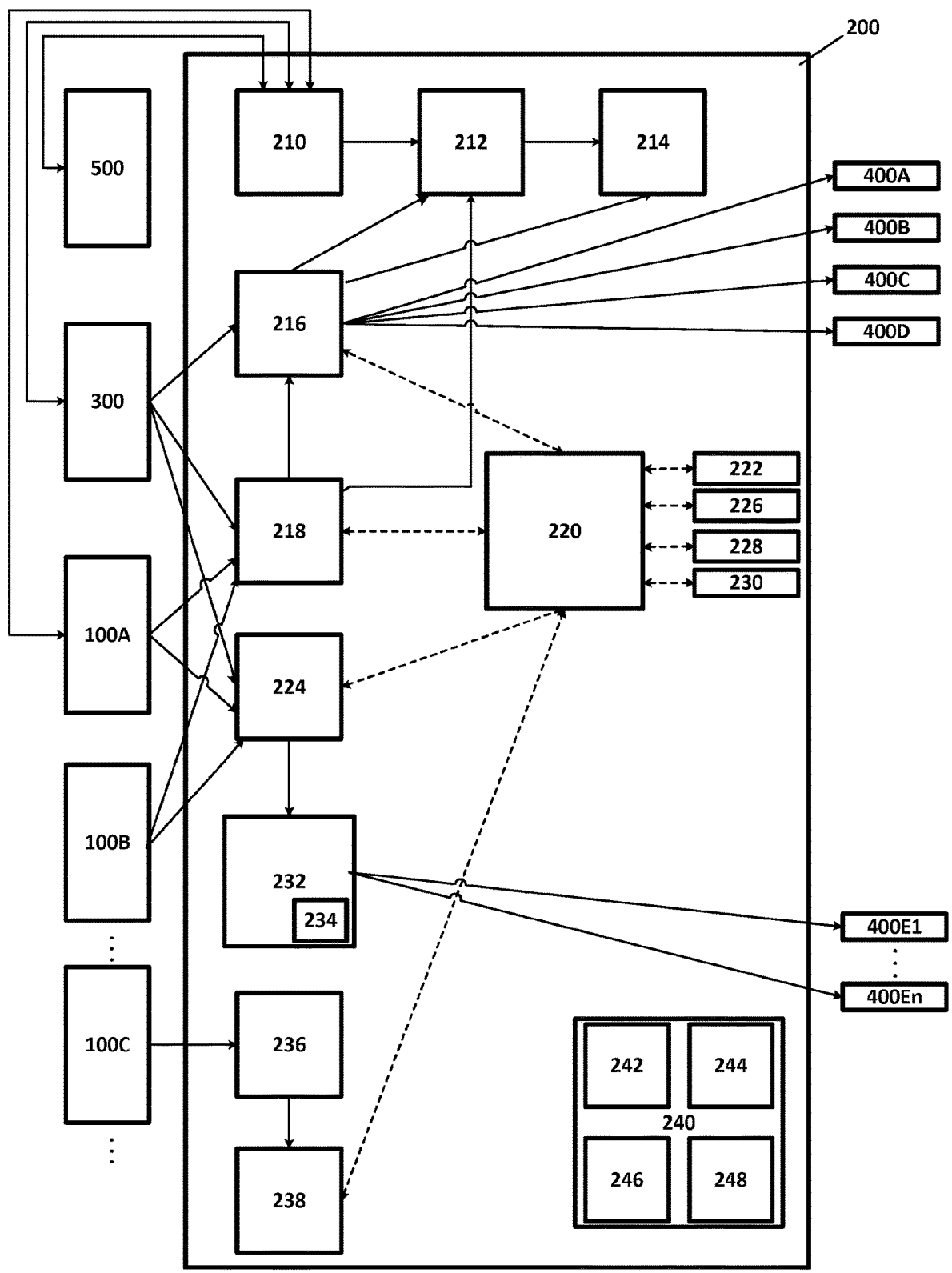
FIG. 3 is a block diagram showing the software component architectures of the live media-streaming system of FIG. 1, according to an embodiment.

FIG. 3 is a block diagram showing the software component architectures of the live media-streaming system 10, according to an embodiment, operable for producing a particular session or show. Shown in FIG. 3 are examples of participant computing devices 100, in particular a participant computing device 100A with a web browser that supports RTP through WebRTC and provides a user interface through the web browser, a participant computing device 100B with a non-browser application (or, "app") that supports RTP and provides a user interface through the non-browser application, and a participant computing device 100C with a more traditional OBS application that supports RTMP and provides a user interface based on the OBS application. Also shown in FIG. 3 is an example director computing device 300, and a server system 200 which is, in this embodiment, instantiated with the configuration shown and underpinned by one or more physical servers using a cloud computing service provided by the Google Cloud platform. Four different example destination computing systems 400A, 400B, 400C, 400D and 400E1 to 400En are also shown. In this embodiment, destination computing system 400A is a Facebook Live computing system, destination computing system 400B is a Twitch computing system, destination computing system 400C is a Periscope computing system, destination computing system 400D is a YouTube Live computing system and, as described above, destination computing systems 400E1 to 400En are WebRTC edge servers as described above. In this embodiment, communications between computing devices 100 and server system 200, and between server system 200 and destination computing systems 400 are conducted through the Internet using IP-based communications protocols. Also shown is a dashboard computing system 500, which in this embodiment is also in communication with the server system 200 through the Internet. Dashboard computing system 500 is for providing an administrator user or operator of server system 200 with an interface for monitoring operations of server system 200 from a remote location.

It will be understood that server system 200 may be employed simultaneously by multiple director computing devices 300 to produce respective independent shows involving different respective participants and different channels to the same or different destination computing systems 400. In this embodiment, the capacity of server system 200 to be scaled to handle multiple shows and multiple participants is facilitated in a known manner through deployment of server system 200 via a cloud computing arrangement as referred to above.

Participant computing device 100A, configured to transport media streams with server system 200 using RTP, is provisioned with a participant user interface 110 by server system 200, for operation within a web browser running on participant computing device 100A. In particular, once a participant has registered generally as a user upon invitation by a director to a particular show as will be described, the web browser running on participant computing device 100A is directed via a participant interaction (such as the clicking of a hyperlink) to make an HTTP API request to a web server 210 (in this embodiment, an OPEN RESTY web server) executing within server system 200. Web server 210 responds to the web browser's request by querying and retrieving an executable file—in this embodiment a JavaScript file (for example, Performer.js)—from an API Server 212 and returning the executable to web server 210 for deploying to participant computing device 100A.

Integrating real-time communications functionality provided by WebRTC with a JavaScript-based user interface such as participant user interface 110 requires consideration that WebRTC uses the same resource pool as does the web browser itself. This is different from, for example, a Flash-based application that can be configured to integrate communications and user interface functionality using separate memory and processing thread resources than the web browser's. As such, implementation of the browser-based user interface (for rendering objects such as icons, canvases etc.) and the WebRTC-based handling of streams (for display of and, as will be described, mixing of audio and video, etc.), as well as messaging, should advantageously be done in a resource-conscious way so as to not exceed the web browser's thread limits. As will be described below, some of the control over the amount of data that such a web browser is required to manipulate may be exercised by server system 200 during transcoding of incoming live media streams. Such incoming live media streams may be originally coded with very high video resolutions to reduce the resolutions to a more wieldy resolution (such as from 1080p or higher down to 720p), prior to providing such content to the web browser for mixing.

API Server 212 generates one or more records in a database 214 in order to generate a participant identifier corresponding to the participant computing device 100A that can be used during the session for routing and managing status of the particular participant computing device 100A. When executed within the web browser environment by processing structure on participant computing device 100A, the executable file displays and makes operable the participant user interface 110 within that web browser.

Participant computing device 100B, configured to transport media streams with server system 200 using RTP but via a locally installed application, is not provisioned with an executable file for generating a user interface deployed by server system 200. The locally installed, non-web browser application executes the routines for displaying the user interface locally. However, when connecting to a particular show to which an invitation has been provided, participant computing device 100B is provided with a participant identifier in a similar manner as is participant computing device 100A. In this embodiment, participant computing device 100B is an iOS-based smartphone.

Handling dynamic resolution changes is useful for enabling system 10 to function with low latency particularly for the mixing workflow but also for broadcasting, even in the event that a particular participant computing device 100 is communicating over a much slower or less reliable connection. The ability to control, to a degree at least, some error recovery is also useful to reduce the chance of stream breakage, packet loss and jitter. With these considerations in mind, and further because transcoding is required when preparing incoming WebRTC streams for outgoing transport as RTMP streams (due for example to WebRTC not supporting AAC audio codecs used in RTMP and RTMP not supporting Opus audio codecs used in WebRTC, for examples, as well as RTMP not supporting the VP8 and VP9 video codecs used in WebRTC), and vice versa, server system 200 has a particular novel architecture. In particular, server system 200 includes a full WebRTC server-side implementation using a WebRTC gateway 232 provisioned with a custom RTSP plugin 234, to restream media data from WebRTC to RTMP and vice versa. In this embodiment, the WebRTC gateway 232 is a Janus WebRTC gateway. The RTSP plugin 234 handles publishing of incoming streams that have been transcoded to become WebRTC-compatible media streams into the Janus WebRTC gateway 232 using RTSP controls, and enables other processes to read or "play" RTSP controls back from the Janus WebRTC gateway 232 for, for example, broadcasting. Such transcoding may involve decoding audio components of media streams that are not WebRTC-compatible and recoding the audio streams in a WebRTC-compatible format, and/or reducing the resolution of an incoming high-resolution video component so that video can be streamed along by the WebRTC gateway without bogging down the server system 200 or a downstream participant computing device 100, for examples. In this embodiment, multiple concurrent streams over many threads are handled while ensuring thread safety. That is, while ensuring the implementing code being threaded does not interact with the shared data structures being used for the processing and storage in an unintentional/destructive manner.

The Janus WebRTC gateway 232 with the above-described RTSP plugin 234 was able to use the direct source media stream for restreaming, rather than requiring first normalization of resolution and framerate, as did other systems that were tested during research and development required. Furthermore, as compared with the other systems, the burden on the processing structure of server system 200 was reduced by a factor of 4, latency was reduced by 1.5 seconds, and dynamic resolution changes could be supported.

Participant computing device 100C, configured to transport media streams to server system 200 using RTMP via a locally-installed application, is not provisioned with a participant user interface 110 at show time by server system 200 since the locally-installed application executes the routines for displaying the user interface locally.

In a similar manner to participant computing device 100A, director computing device 300, configured to transport media streams to and from server system 200 using RTP, is provisioned with a director user interface 310 by server system 200, for operation within a web browser running on director computing device 300. In particular, once a director has registered generally as a user directing a new show, the web browser running on director computing device 300 is directed via a director interaction (such as the clicking of a hyperlink) to make an HTTP API request to web server 210. Web server 210 responds to the web browser's request by querying and retrieving an executable file—in this embodiment a JavaScript file (for example, Switcher.js)—from API Server 212 and returning the executable file to web server 210 for deploying to director computing device 300. When executed within the web browser environment on director computing device 300, the executable file displays and makes operable the director user interface 310 within that web browser.

A similar process for provision of a web-based user interface is conducted for dashboard computing device 500.

Server system 200 further includes a distribution manager process 216. Distribution manager process 216 is in communications with API server 212 via HTTP and with database 214 via HTTP. Distribution manager process 216 handles the respective HTTP-based communications with the destination computing systems 400A-400D, including enabling account authorizations, output broadcast set-ups, teardowns, and error handling via Websockets and HTTP connections with respective director computing devices 300.

Server system 200 further includes the floor manager process 218 which serves to retains a persistent communications connection using the Websockets API, for the duration of a given show, with each of the web browsers of participant computing device 100A, director computing device 300, and dashboard computing device 500, for the purpose of transporting media streams and other data. Floor manager process 218 also retains a persistent communications connection using the Websockets API with each of the web browsers of participant computing device 100A, and director computing device 300. Floor manager process 218 generally manages communications between different components and their state, with the exception of the communications connections with destination computing devices 400A-D, which are managed by distribution manager process 216.

A daemon process 224, in this embodiment a Janus daemon, serves as an interface for additional Websocket API connections by director computing device 300 and participant computing device 100A and 100B to a Janus WebRTC gateway 232. Janus daemon 224 interfaces with Janus WebRTC gateway 232 on behalf of the director computing device 300 and participant computing device 100A and 100B via respective Websocket proxy connections, thereby to validate invitation codes being presented by participant computing devices 100 in response to provision by directors of electronic invitations associated with respective broadcast IDs for a session.

In this embodiment, the Janus WebRTC gateway 232 is modified with an RTSP plugin 234 in order to provide quality handling of the production of RTSP outputs using the gateway 232 from WebRTC inputs, as will be described.

Server system 200 also includes an HTTP server 236, in this embodiment an NGINX server, which is instantiated for handling media streams, other data and control signals over RTMP and RTSP from non-browser based systems that are oriented to produce RTMP media streams, such as participant computing device 100C described above. HTTP server 236 is in communications using HTTP with a daemon process 238 that, through a messaging queue process (described below), will validate a stream key parsed from the connection URL provided by participant computing device 100C. This is done to validate the connection and authorize HTTP server 236 to receive a media stream over the connection and associate the media stream with a particular show for routing the content of the stream accordingly as will be described, to the appropriate director computing device 300. In this embodiment daemon process 238 is an NGINX daemon process.

A messaging queue architecture is deployed within server system 200 in order to handle messaging between processes of server system 200 thereby to facilitate their interoperation, for example by validating stream keys in order to authorize ingestion of media streams by HTTP server 238, and by validating broadcast id's, invitation codes, social network authorizations, account details, authorized persistent stream keys, and the like. In this embodiment, a RabbitMQ message queue process and database 220 receives and handles messages to be provided by and retrieved by distribution manager 216, floor manager process 218, the daemon process 224, and daemon process 238.

Also in communications with RabbitMQ message queue process and database 220 for facilitating interoperation are a media backend schedule process 222, a restreamer process 226 (in this embodiment, an FFMPEG-based restreamer process), a recorder process 230 (in this embodiment, an FFMPEG-based recorder process), and a RTMP ingester process 228 (in this embodiment, an FFMPEG-based ingester process).

Figure 4:
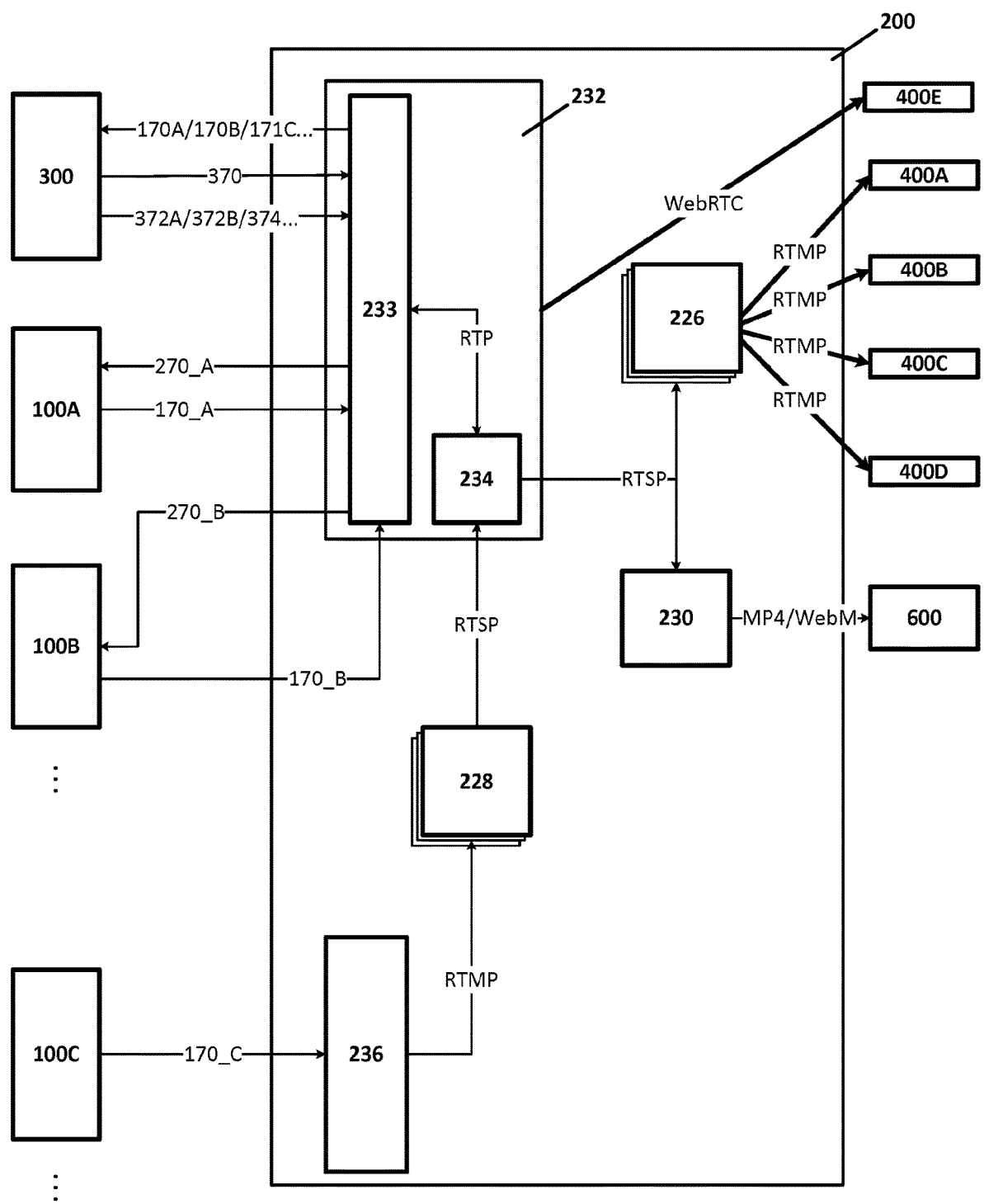
FIG. 4 is a block diagram showing a media stream architecture of the live media-streaming system of FIG. 1, according to an embodiment.

FIG. 4 is a block diagram showing a media stream architecture of the live media-streaming system of FIG. 1, according to an embodiment. Once a show has been established, participant computing device 100A transports an outgoing live media stream or set of live streams 170A to a Janus core 233 of the Janus WebRTC gateway 232. This is done using Secure RTP (SRTP) protocol over DTLS (Datagram Transport Layer Security) protocol provisioned using WebRTC (via the web browser) along respective channels that are associated, in database 214, with participant computing device 100A for handling and routing. Live media stream(s) 170A include video content captured using a video camera and audio content captured using a microphone of participant computing device 100A under the direction of the web browser on computing device 100A. In this embodiment, the video content is encoded for streaming over SRTP/DTLS by participant computing device 100A using a VP8 video codec, and the audio content is encoded for streaming over SRTP/DTLS by participant computing device 100A using an Opus audio codec. The codecs are WebRTC-compatible. Alternative codecs may be employed. In addition, an incoming preview media stream or set of streams 270A is transported from the Janus core 233 of the Janus WebRTC gateway 232 along respective channels that are associated, in database 214, with participant computing device 100A for display. The incoming preview media stream(s) include video content and audio content encoded using a VP8 video codec and an Opus audio codec, respectively. Again, alternative codecs may be employed. A separate channel (not shown) is used for the transport of other data, such as user-readable text messages and machine-readable status messages for, respectively, communications between a director and a participant and communications between director, participant and server system computing devices 300, 100 and 200.

Similarly, once a show has been established, participant computing device 100B transports an outgoing live media stream or set of live streams 170B using Secure RTP (SRTP) protocol over DTLS (Datagram Transport Layer Security) protocol provisioned by the local application to the Janus core 233 of the Janus WebRTC gateway 232 along respective channels that are associated, in database 214, with participant computing device 100B for handling and routing. Live media stream(s) 170B include video content captured using a video camera and audio content captured using a microphone of participant computing device 100B under the direction of the local application on computing device 100B. In this embodiment, the video content is encoded for streaming over SRTP/DTLS by participant computing device 100B using a VP8 video codec, and the audio content is encoded for streaming over SRTP/DTLS by participant computing device 100B using an Opus audio codec. In alternative embodiments, other codecs for audio and/or video, such as VP9, H265, for examples, may be used. In addition, an incoming preview media stream or set of streams 270B is transported from the Janus core 233 of the Janus WebRTC gateway 232 along respective channels that are associated, in database 214, with participant computing device 100B for display. The incoming preview media stream(s) include video content and audio content encoded using a VP8 video codec and an Opus audio codec, respectively. Again, in alternative embodiments, other codecs for audio and/or video, such as VP9, H265, for examples, may be used. A separate channel (not shown) is used for the transport of other data, such as text messages between a director and a participant using participant computing device 100B sent via server system 200.

Participant computing device 100C transports an outgoing media stream or set of streams 170C using non-WebRTC compatible RTMP to the RTMP ingest gateway 236 of the server system 200 along a respective channel that is associated, in database 214, with participant computing device 100C for handling and routing. Media stream(s) 170C include video content captured using a video camera and audio content captured using a microphone of or connected to participant computing device 100C under the direction of the local (for example, OBS-based) application on participant computing device 100C. In this embodiment, the video content is encoded for streaming over RTMP by participant computing device 100C using an H.264 video codec, and the audio content is encoded for streaming over RTMP by participant computing device 100B using an MP3 audio codec. In this embodiment, unlike participant computing devices 100A and 100B, participant computing device 100C is not provided with an incoming preview media stream or set of streams, nor does participant computing device 100C maintain an additional channel with server system 200 for the transport of other data for messaging. As such, participant computing device 100C functions, in this embodiment, solely as a source of media streams. In the event that an operator of participant computing device 100C wished to receive incoming preview media streams as do other participant computing devices 100, the operator might in addition operate another, differently configured participant computing device 100 that interfaces with server system 200 but functions similarly to one of participant computing devices 100A or 100B.

In this embodiment, director computing device 300 receives multiple incoming media streams 170A, 170B, 171C transported from the Janus core 233 of the Janus WebRTC gateway 232 along respective channels that are associated, in database 214, with respective ones of participant computing device 100A, 100B and 100C. The incoming media streams are transported using Secure RTP (SRTP) protocol over DTLS (Datagram Transport Layer Security) protocol provisioned by the Janus core 233 of the Janus WebRTC gateway 232 to the web browser of director computing device 300 along respective channels that are associated, in database 214 for tracking, with participant computing devices 100A and 100B. The media streams include video content and audio content encoded using the WebRTC-compatible VP8 video codec and Opus audio codec, respectively. As will be described, incoming media streams 170A and 170B have been relayed, effectively, by the Janus core 233 without modification after being received from respective ones of the participant computing devices 100A and 100B. Incoming media stream(s) 171C is constructed in near real-time by server system 200 using the content of media stream(s) 170C being received over RTMP by HTTP server 236.

Director computing device 300 also generates an outgoing, or mixed, video stream 370 for transport using Secure RTP (SRTP) protocol over DTLS (Datagram Transport Layer Security) protocol provisioned using WebRTC (via the web browser) to the Janus core 233 of the Janus WebRTC gateway 232 along respective channels that are associated, in database 214, with director computing device 300 for handling and routing. Video stream 370 includes video content generated at director computing device 300 on the basis of a selected (by a director) mix of the contents of one or more of the incoming media streams 170, 170B, 171C transported by Janus core 233 and/or other local media data (such as video and still image files). Video stream 370 may include any video content captured using a video camera of director computing device 300 under the direction of the web browser on director computing device 300, and/or streamed directly to the browser-based mixer from another source. The contents of mixed video stream 370 is encoded for streaming over SRTP/DTLS by director computing device 300 using a VP8 codec. In alternative embodiments, other codecs for audio and/or video, such as VP9, H265, for examples, may be used. Generally, mixed video stream 370 is the result of mixing being done by an operator using director computing device 300, and a copy of mixed video stream 370 will be routed by Janus core 233 to each of the participant computing devices 100A and 100B to serve as video components of their respective incoming media streams 270A, 270B. Mixed video stream 370 will also be handled by WebRTC gateway 232 for actual further processing and routing to selected destination computing devices 400 for broadcast, at the instruction of an operator of director computing device 300, as will be described.

Director computing device 300 also generates multiple audio streams 372A, 372B and 374 for transport using secure RTP (SRTP) protocol over DTLS (Datagram Transport Layer Security) protocol provisioned using WebRTC (via the web browser) to the Janus core 233 of the Janus WebRTC gateway 232 along respective channels. Audio stream 372A is transported along a channel that is associated, in database 214 for tracking, with participant computing device 100A. Audio stream 372B is transported along a channel that is associated, in database 214 for tracking, with participant computing device 100B. Audio stream 374 is transported along a channel that is associated, in database 214 for tracking, with director computing device 300.

In this embodiment, audio streams 372A, 372B and 374 include respective audio content generated at director computing device 300 on the basis of a selected (by a director) mix of the contents of one or more of the incoming media streams 170, 170B, 171C transported by Janus core 233 and/or other local media data (such as audio files). They may also include any audio content captured using a microphone of director computing device 300 under the direction of the web browser on director computing device 300, and/or streamed directly to the browser-based mixer from another source. The contents of outgoing audio streams 372A, 372B and 374 are encoded for streaming over SRTP/DTLS by director computing device 300 using an Opus codec. This is a WebRTC-compatible codec. In alternative embodiments, other codecs may be used. Generally, audio streams 372A, 372B and 374 are the result of mixing being done by an operator using director computing device 300, and audio stream 372A will be routed by Janus core 233 to participant computing device 100A, whereas audio stream 372B will be routed by Janus core 233 to participant computing device 100B, to serve as respective audio components of their respective incoming preview media streams 270A, 270B. Audio stream 374, in turn, will also be handled by WebRTC gateway 232 for actual further processing such as direct broadcasting and/or routing along with outgoing video stream 370, to selected destination computing devices 400 for broadcast, at the instruction of an operator of director computing device 300, as will be described.

It will be noted that, while there is a single mixed video stream 370 to be fed back to participant computing devices 100 and processed and routed for broadcast, there are multiple audio streams 372A, 372B, 374 generated by director computing device 300 in association with outgoing video stream 370. This is done in order to provide each participant computing device 100 that is receiving a feed of the video mix prepared by the director with a custom audio mix that does not include audio that was initially generated at the respective participant computing device 100. In this way, each participant does not have to hear their own audio fed back, since it would be perceivably if only slightly delayed pursuant to being transported through server system 200 to director computing device 200, mixed and transported back through server system 200. As such, generally-speaking, if there are X number of participant computing devices 100 with media streams 170 being mixed on a director computing device 300, there will be X custom mixed audio streams generated by director computing device 300 and an additional main mixed audio stream 374 generated by director computing device 300.

The audio and video mixing done locally at the director computing device 300 relieves server system 200 from having to be significantly linearly scaled for each mixing process to be executed by making use of the processing power of director computing device 300 rather than solely that of server system 200. This reduces the cost of operation of server system 200. Furthermore, employing director computing device 300 for such mixing rather than server system 200 enables director computing device 300 to facilitate precision control over mixing and immediate feedback without the latency, loss of synchronization, and problems with event signalling that would be inherent were director computing device 300 merely instructing server system 200 to do the mixing and being provided with merely a window into the resultant mix.

While providing custom audio mixes for each mixed-in participant increases the processing burden on each individual director computing device 300 (over, for example, providing only one final audio mix), the additional processing burden imposed on director computing device 300 is a worthwhile trade-off as it ensures system 10 is pleasant to use for participants and that a director operating director computing device 300 is provided with real-time feedback as to the actual contents that are being mixed.

Referring still to FIG. 4, incoming media streams received at server system 200 from participant computing device 100C (and others like it that, rather than transporting media streams over RTP, transport media streams over non-WebRTC compatible formats such as RTMP), are received at the HTTP server 236. HTTP server 236 includes an RTMP plugin to provision it as an RTMP ingest gateway and thus, in effect, handles connections with participant computing devices such as participant computing device 100C as well as handles the media streams that are transported over the connections. HTTP server 236 with the RTMP plugin alerts other components of server system 200 that there is an inbound RTMP stream and once validated causes the instantiation of a FFMPEG ingest processes 228 via an FFMPEG server for each of the incoming media streams, and transports each incoming media stream to a respective FFMPEG ingest process 228 internally over RTMP.

In turn, in this embodiment the FFMPEG ingest process 228 transcodes the RTMP stream in an appropriate way to form an RTP stream that the ingest process 228 "plays" using RTSP into RTSP plugin 234 of Janus WebRTC gateway 232. In this embodiment, transcoding in an appropriate way may involve converting the RTMP streamed H264+AAC content incoming at 1080p to RTP/RTSP streamed H264+Opus content at 720p. In such an example, AAC audio is not WebRTC-compatible, prompting the transcoding by decoding and recoding of the incoming audio into WebRTC-compatible Opus audio format for transport using RTP/RTSP. Furthermore, it will be understood that 1080p video is compatible with WebRTC but, in the present application, may introduce undue transport and processing delays in the context of the overall system 10, and thus is reduced in resolution prior to being played into the RTSP plugin 234 for downstream handling Other conversions, down samplings and useful manipulations may be conducted and are referred to more generally herein using the term transcoding.

RTSP plugin 234, in turn, in near real-time, relays the RTP/RTSP-transported content, internally within Janus WebRTC gateway 232, to Janus core 233 for, in turn, transporting to director computing device 300 for mixing etc., in a similar manner as has been described in connection with media streams that originating at participant computing devices 100A and 100B.

It will be noted that packet sizing is an important parameter when converting from RTMP to WebRTC using RTSP as an intermediary. In this embodiment, RTSP plugin 234 is configured to take into account that the size of packets extracted from RTMP-transported content and encrypted as DTLS for WebRTC by Janus core 233 can, without modification, exceed a maximum allowable size of a DSL (Digital Subscriber Line) packet, resulting in a client (such as director computing device 300) silently dropping packets. For example, during testing, it was discovered that for typical use a maximum size of an encrypted packet that would not generally be dropped client-side is 1472 bytes, which can achieve 720p resolution at 30 fps reliably.

While implementation of the RTSP plugin 234 can generally be done in a way that reduces packet size to 1472 bytes prior to encryption, certain communications networks (such as VPNs, or Virtual Private Networks) can impose additional security overhead thus causing the packet sizes to exceed 1472 bytes. As such, in this embodiment in order to be compatible with a very wide range of participant computing devices providing media over non-WebRTC compatible formats such as RTMP, as well as a very wide range of networking scenarios, the packet size pre-encryption produced by RTSP plugin 234 is 1200 bytes. It was discovered that 720p and 30 fps is also achievable with the smaller packet size.

RTSP plugin 234 and the pipeline for ingesting and playing initially non-WebRTC compatible media streams using RTSP into WebRTC gateway using the RTSP plugin 234 thus serves as a mechanism by which content in media streams ingested via non-WebRTC compatible formats such as RTMP-outputting sources can be fully integrated into mixes along with the content of originating RTP-based media streams.

Alternatively or in addition, in order to ingest other forms of non-WebRTC compatible media streams, other capabilities of HTTP server 236 may include different plugins for different transport protocols. For example, while in the above embodiment an RTMP plugin provisions HTTP server 236 as an RTMP ingest gateway, in other embodiments a HTTP Live Streaming (HLS) plugin may be provided to ingest and instantiate respective FFMPEG ingest processes 228 for handling the pipeline of transcoding of HLS media streams and RTP/RTSP provision of the transcoded media streams to the WebRTC gateway 232 via the RTSP plugin 234. Similarly, a Faster Than Light (FTL) plugin may be provided to ingest and instantiate respective FFMPEG ingest processes 228 for handling the pipeline of transcoding of FTL media streams and RTP/RTSP provision of the transcoded media streams to the WebRTC gateway 232 via the RTSP plugin 234. Other formats may similarly be supported in a similar way.

RTSP plugin 234 also serves as a key mechanism by which the DTLS-SRTP-based media streams generated on director computing device 300 (and any other director computing device 300 that may be handling, at the same time, a respective show with respective participants) can be transcoded by server system 200 for broadcasting, such as for transport to destination computing systems 400A-400D over RTMP. More particularly, in the event that director computing device 300 causes mixed video stream 370 and mixed audio stream 374 to "go live", as will be described in further detail, an instruction is sent by director computing device 300 to Janus core 233 to route these media streams accordingly. In response, mixed video stream 370 and mixed audio stream 374 are routed by Janus core 233 over RTP to RTSP plugin 234, involving depackaging using a Gstreamer process. These audio and video streams may be multiplexed together at this point in the process, or may be separate but otherwise linked. RTSP plugin 234 transports the transcoded audio and video over RTP for 'playing', under the control of RTSP, the RTP-transported media to one or more FFMPEG re-streamer processes 226. An FFMPEG re-streamer process 226 is instantiated for each channel on each destination computing system 400 to which the broadcast-ready media stream is to be routed. Each FFMPEG re-streamer process 226, in turn, in near real-time, transcodes the RTP-transported content to the respective format required by the channel/destination computing system 400 with which it is associated, and transports a respective stream of the transcoded content over RTMP along the respective channel to the respective destination computing system 400. It will be noted that HTTP connections corresponding to channels over which the media streams are transported are handled through distribution manager 216 of server system 200.

As described above, Janus core 233 of WebRTC gateway 232 can also stream the WebRTC-based mixed video stream 370 and mixed audio stream 374 directly downstream to a viewer V with a computing device capable of ingesting WebRTC live media streams. Alternatively, as described above, the content distribution network can benefit from peer-to-peer scaling involving the WebRTC edge servers 400E as described above. It has been found that WebRTC, which is generally-regarded as a peer-to-peer technology, when used for content distribution as between content delivery servers, enables the overall content delivery network to avoid transcoding completely or at least until the stream reaches near to the edge. WebRTC is more expensive to scale than, for example, HLS, but WebRTC is much lower latency and is also more inherently secure than are other alternatives such as HLS. In comparison, when media content is sent to destination computing devices 400A-D using RTMP as described above, a multi-second delay is incurred upon reaching the computing devices 400A-D since they tend to decode and re-encode the received content according to internal standards or legacy systems, which takes time to do. For example, is has been found that, when YouTube receives RTMP content from a source such as server system 200, YouTube will transcode the content to H.264, HLS or VP9 before redistribution through its content delivery network. This can increase latency by several seconds, such that the standard for low latency can be 5 to 7 seconds.

Latency may not be seen as important for certain kinds of applications. For example, when using media players merely to watch/listen to a broadcast, a viewer might not even sense he or she is behind the performer by several seconds.

However, latency can be very noticeable for live broadcast applications that are interactive, such as applications enabling viewers to react to a performer with text comments or other timely feedback intended to be seen and, in turn, reacted to by the performer. With significant latency, by the time the viewers are receiving the performance, the performer is already significantly ahead. If such viewers wish to react to what they are seeing, the performer is going to see this reaction only after a significant delay. This quickly becomes noticeable and both the performers and the viewers begin to compensate. Even if there is a delay of 5 to 7 seconds, interactions can become practically unworkable. For example, it is common for a performer to compensate by, after soliciting some feedback from viewers, pausing for several seconds to wait for the performer's content to first traverse the network to reach the viewers and then for the viewers' reactions to make their way back to the performer. However, while a pause can serve to keep performer and viewers together on the same topic, it also serves as an interruption to the performance that can make the delay itself much more noticeable.

Given this, avoiding the time delay that transcoding incurs when done prior to distributing the content through a content delivery network can go a long way towards reducing latency and, accordingly can go a long way towards improving the experiences of using interactive live broadcasting.

As such, by distributing the live media content in its WebRTC form from the server system 200 to one or more WebRTC edge servers 400E, the reduction in latency from several seconds to between 100-500 milliseconds due, in part, to avoiding transcoding prior to distribution, allows the viewer interactions and the performer reactions to be much closer together in time. This enables much more natural, conversational interactions between the performer(s) and the interactive viewers.

In addition to more natural, "conversational" interactions enabled by significantly reducing latency laying the groundwork for enabling more productive interactions, significantly reducing latency with this approach also shortens the "time to first frame"—the time delay between when a viewer V requests a stream and when the viewer V can begin viewing it. Additionally, quality of experience is affected by limitations to the numbers of viewers that can be added in any given period. These quality factors are influenced by the manner in which load balancing is done across multiple WebRTC edge pools, as well as by transport and transcoding latency itself.

It will be appreciated that WebRTC is not inherently designed for mass media distribution. In all cases, the WebRTC mixed video stream 370 and mixed audio stream 374 must be synchronized for viewers so that it can be played back properly on viewer devices after traversing the content delivery network. For this and for managing latency, reliable orchestration is required to handle what may amount to thousands or millions of individual streams traversing the content delivery network and being handled by individual WebRTC edge servers 400E.

In order to operate a new broadcast session, a user wishing to operate his or her computing device as a director computing device 300 navigates using the web browser of the director computing device 300 to server system 200 to request the instantiation of the new broadcast session. This leads the user (the director) to either complete a web-based login process based on a previously-existing account, or create an account. The director may associate his or her account with a previously existing social network account (such as Facebook) thereby to automatically configure a destination computing system 400 to which the broadcast will be transported.

When the director's credentials have been confirmed, floor manager 218 triggers the creation, in conjunction with database 214, of a new session ID. Floor manager 218 then retrieves various elements associated with the director's account including social network authorizations, configured outputs (destination computing systems 400), account details, authorized persistent stream keys (those stream keys that persist in server system 200 for use by certain account holders for different sessions over time), and video server locations. Floor manager 218 also triggers the creation of an invitation code in association with the session ID. This can be provided to and used by the director to provide chosen participants, using respective participant computing devices 100, with a means of routing media data to the particular session (as opposed to another session) for incorporation by the director, at the director's discretion, in the broadcast.

Web server 210 provisions director computing device 300 with a director user interface 310 by deploying an executable file to director computing device 300 for executing within the web browser of director computing device 300. When executed within the web browser environment on director computing device 300, the executable file displays and makes operable a director user interface 310 within that web browser. The director user interface 310 requests permission of the operator of director computing device 300 to access the local default video camera and microphone of director computing device 300 in order to provide a local media feed for the session. Furthermore, if any connections with any destination computing systems 400 have been preconfigured, distribution manager 216 initiates two-way API connections with destination computing systems 400 using Oauth (Open Authorization), thereby to establish channels along which media and other data may be routed between server system 200 and connected destination computing systems 400. The director may also manually establish channels to one or more destination computing systems 400 for the session via the director user interface.

Floor manager 218 also initiates a chat/messaging service for enabling text messaging between director computing device 300 and any participant computing devices 100 that are to be connected to server system 200 and associated with the session. Floor manager 218 also manages participant status, as will be described.

Figure 5:
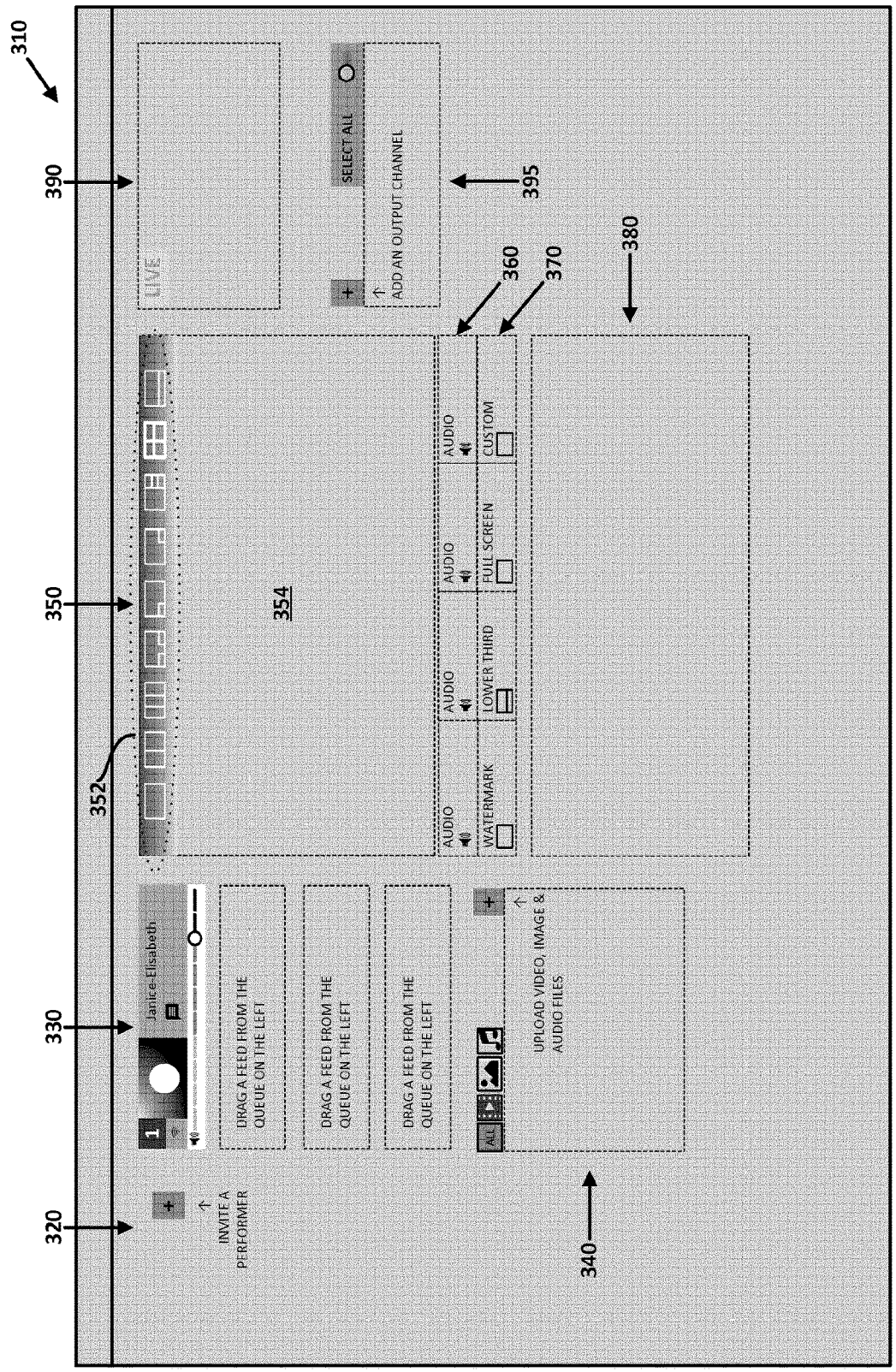
FIG. 5 depicts a browser-based director user interface as displayed within a web browser of a director computing device, according to an embodiment.
Figure 6:
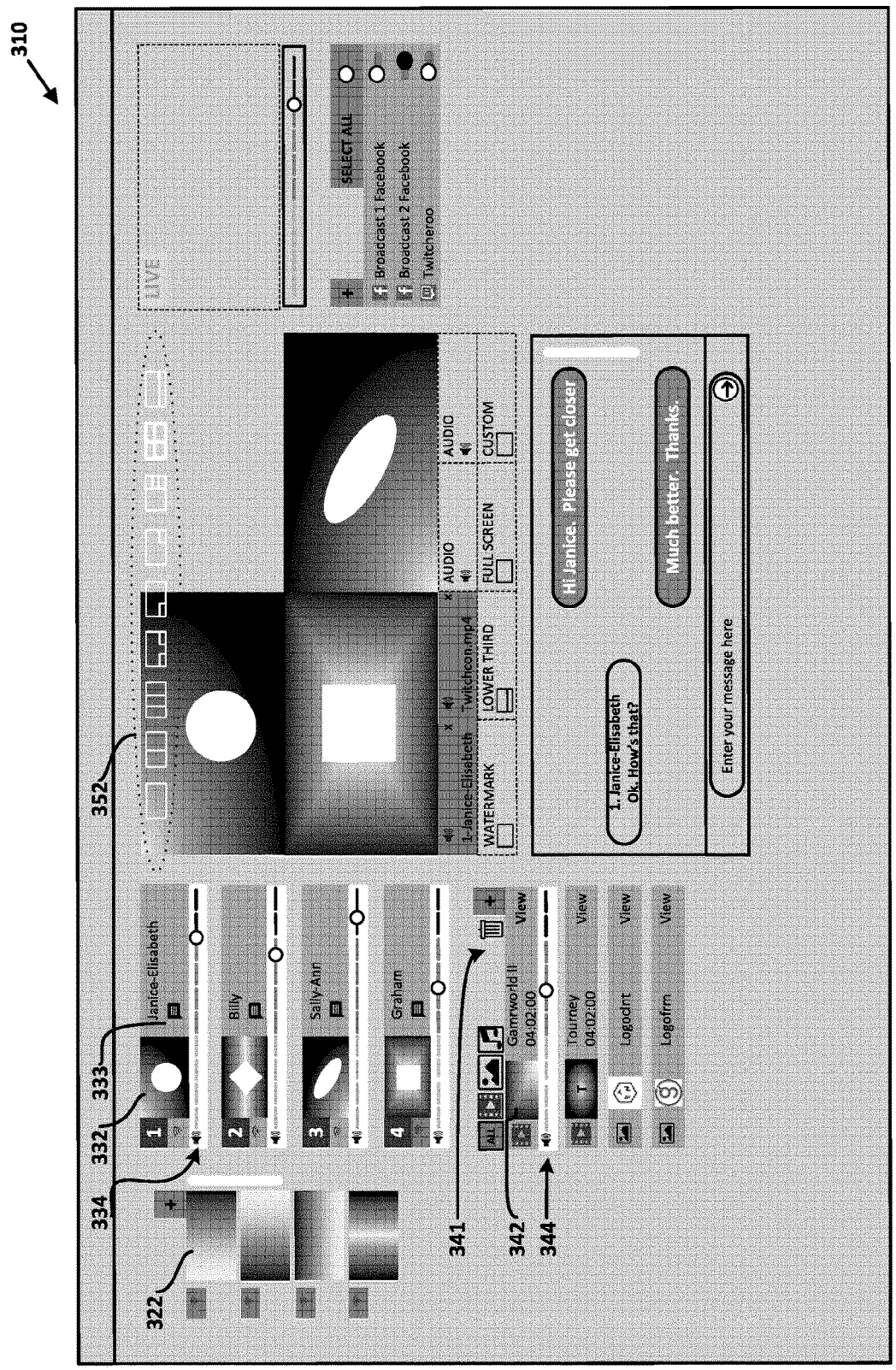
FIG. 6 depicts the browser-based director while a video mix is being established by a director, prior to broadcasting.

FIG. 5 depicts the browser-based director user interface 310 as displayed within a web browser, according to an embodiment, and FIG. 6 depicts the browser-based user interface of FIG. 5 while a first video mix and first audio mix is being established by a director, prior to broadcasting.

Director user interface 310 presents a feed pool region 320, a lineup region 330, a media pool region 340, a video mix region 350, a persistent audio region 360, a video overlay region 370, a chat region 380, a live monitor region 390, and a destination configuration region 395.

In this embodiment, feed pool region 320 provides a director with a selectable icon 321 for generating electronic invitations for participants (electronic messages such as emails or text messages containing hyperlinks incorporating the invitation code that is associated with the current session ID), and representations 322 (in this embodiment, still images and text descriptors such as names, but alternatives are possible) of those participants who have accepted the invitations and are available to provide streaming media from their respective participant computing devices 100 for possible incorporation in the broadcast. In FIG. 6, four (4) such representations 322 are shown. It will be noted that, while server system 200 may be receiving live streaming media from the individual participant computing devices 100 of participants who have accepted invitations, the live streaming media is not routed to director computing device 300 until such time as an operator of director computing device 300 selects a representation 322 for inclusion in lineup region 330. Selection may be done by clicking and dragging representation 322 into lineup region 330. When a representation 322 is selected by an operator of director computing device 300 from feed pool region 320 for inclusion in lineup region 330, director user interface 310 causes director computing device 300 in turn to signal floor manager 218 to, via daemon process 224, cause Janus WebRTC gateway 232 to route the respective incoming media stream from the corresponding participant computing device 100 to director computing device 300 over WebRTC.

In this embodiment, lineup region 330 provides a director with a mechanism for listing representations 332 (in this embodiment, received video along with text descriptors such as names) of those participants whose media streams have been selected by the director from the feed pool region 320 for likely mixing for a broadcast. In FIG. 6, four (4) such representations 332 are shown in association with respective lineup numbers (1 through 4). Selection for inclusion in a broadcast may be done by clicking and dragging representation 332 into video mix region 350 and/or into persistent audio region 360. Participant computing devices 100 whose representations 332 are brought into the lineup region 330 are provided by server system 200 with a status update message such that participant user interfaces 110 running on participant computing devices 100 can display a "Standby" status message to the participant. Lineup region 330 also includes, for each participant representation 332, an icon 333 for sending messages, by typing within chat region 380, via chat/messaging service initiated by floor manager 218 to the respective participant computing device 100. Lineup region 330 also includes, for each participant representation 332, a respective volume control 334 for controlling the volume at which the respective participant media stream is provided to a mixer process, thereby to control the relative volume of the respective participant media stream in the mix.

In this embodiment, media pool region 340 provides a director with selectable icons 341 for enabling a user to add or delete video, still images or audio media files to and from a media pool and for displaying representations 342 (in this embodiment, still images and text descriptors) of such media files. Media files whose representations 342 are displaying in media pool region 340 are available for possible incorporation in the broadcast. In FIG. 6, four (4) such representations 342 are shown, namely two video files and two still image files. Selection may be done by clicking and dragging representation 342 into video mix region 350, into persistent audio region 360, and/or into video overlay region 370. For audio/video and audio-only media files whose representations 342 are listed in media pool region 340, a respective volume control 344 for controlling the volume at which the respective media file is provided to the mixer process controls the relative volume of the respective media file in the mix.

In this embodiment, video mix region 350 provides a director with an area in which to build a video mix using the resources from the lineup region 330 and the media pool region 340 and to see displayed the result of the video mix. Video mix region 350 includes a layout selector 352 and a scene region 354. Layout selector 352 provides a director with a number of options as to how scene region 354 is to be subdivided into scene subregions. In this embodiment, there are nine (9) options provided by layout selector: full, two-equal subregions, three-equal subregions, main with two lower-corner subregions, main with left lower-corner subregion, main with right lower-corner subregion, main with three right-side subregions, four-equal subregions, and main with lower-third subregion.

In this embodiment, as shown in FIG. 6, the four-equal subregions layout is shown as selected, and three (3) representations 332 have been selected from lineup region 330 for placement in respective subregions. Furthermore, two audio inputs (one from lineup region 330 and one from media pool region 340) have been selected for inclusion in persistent audio region 360. As such, the video mix for the scene being built currently includes just the video streams from participants 1, 2 and 3, while the main audio mix for the scene being built includes the audio streams from participants 1, 2 and 3 in addition to the audio from "Twitchcon.mp4". In this example, audio from "Janice-Elisabeth" is placed in persistent audio region 360 in order to enable this participant to maintain persistent audio contribution (as a host, for example) even when her corresponding video may not be included in the video mix itself.

Also as shown in FIG. 6, no media files have been selected for inclusion in video overlay region 370. Furthermore, live monitor region 390 shows as blank, since in the state of director user interface 310 shown in FIG. 6, the operator has not authorized content being assembled into the mix to be yet broadcasted. However, as will be described, default contents of image and audio buffers associated with the live monitor region 390 are automatically subjected to a mixing process during which a video stream 370 showing only black (default) frames and an audio stream 374 with silent (default) audio are being transported to server system 200. They are thereafter restreamed to any destination computing devices 400 that are selected and activated using destination configuration region 395. In this way, the respective restreaming processes 226 are instantiated and streaming content such that, when the live video and audio buffers are populated with the results of the mixing as directed by a director using director user interface 310 of director computing device 300, the results can go live very quickly.

In this embodiment, destination configuration region 395 lists an icon 396 for enabling a user to add destination computing systems 400 (such as the two Facebook Live timeline destinations and the Twitch destination listed) to which broadcasts can be transported, and a control 397 for turning routing to all or individual destination computing systems ON or OFF. In FIG. 6, "Broadcast 2 Facebook" is shown as turned on, which corresponds to an instruction to server system 200 to convert and route a mixed video stream 370 and a main mixed audio stream 374 from director computing system 300 for the corresponding channel on a Facebook Live destination computing system 400 for, for example, live presentation on a user's Timeline. Should any particular destination computing system 400 be selected as ON, a blank video is routed to the destination computing system 400 until it can be replaced with the mix built by the director using director computing device 300. In this way, broadcasting of content mixed by the director via destination computing systems 400 can occur simply by switching the default blank media streams with the mixed media stream when the director desires.

The live media streams being received from individual participants are received and handled by, and accessible from, an input process operating within the web browser of director computing device 300. For example, a director user interface process that generates and presents director user interface 310 within the browser is able to route media streams being handled by the input process to be displayed in lineup region 330 and to be displayed, if selected by user, in a respective subregion of scene region 354 of video mix region 350. The mixing process to be described is executed within the web browser, local to director computing device 300. In order to keep the web browser from exceeding browser thread limits or otherwise overwhelming the processing structure of director computing device 300, limits are placed on the number of media streams that the input process is required to receive and handle. In this embodiment, while only four (4) media streams are shown, a limit to the number of media streams required to be handled by the input process is five (5). This is based on the capacity of a typical modern computing device such as a MacBook Pro computer (Apple Computer, Inc.) or another typical device such as a Windows 10-based gaming-capable laptop or desktop computer. However, alternatively, a director computing device 300 could be configured to signal server system 200, either during initialization or at some other time, to inform server system 200 that director computing device 300 has either greater or lesser capability to properly run an input process (and a mixing process) that could handle more or fewer than five (5) media streams, and server system 200 could adapt the number of streams it enables for transport to director computing device 300. It will be understood that, in the event that a given computing device that is requesting to start a session as a director computing device 300 is not capable of handling a minimum level of processing, a user may be provided with appropriate warning by server system 200 and/or by the executable software being executed on the proposed director computing system 300 upon initialization.

The mixing process receives as input any media streams specified by the director using the director user interface 310 to be routed from the input process for inclusion in the video mix, a main audio mix, and custom audio mixes, as will be described in further detail below. More particularly, those media streams selected by the director from lineup region 330 for inclusion in the scene region 354 and/or the persistent audio region 360. Participant computing devices 100 whose representations 332 are brought into the scene region 354 and/or the persistent audio region 360 are provided by server system 200 with a status update message such that participant user interfaces 110 running on participant computing devices 100 can display an "On Deck" status message to the participant. The mixing process also receives as input any audio and/or video and/or image files that have been selected by the director from the media pool region 340 for inclusion in the scene region 354 and/or the persistent audio region 360 and/or the video overlay region 370. The mixing process also receives as input, those parameters specified by the director using the director user interface 310. For example, the parameters include parameters specifically associated with respective media streams or files (such as volume of a particular audio component of a media stream as set by audio control 334, or location within the scene region 354 of a particular video or video stream), and global parameters (such as overall scene layout as selected from the layout selector 352, final audio mix volume, and the like).

The mixing process receives and processes the media streams with which it has been presented to produce respective sequences of audio segments (audio frames, or collections of sequential audio samples) and video segments (video frames) which can then be combined according to respective and global parameters. The mixing process also processes audio and/or video files selected from the media pool region 340 for inclusion in persistent audio region 360 or video overlay region 370 to produce respective sequences of audio segments (audio frames) and video segments (video frames) which can then be combined with the others according to respective and global parameters.

Multiple video frame buffers are employed by the mixing process within the web browser on director computing device 300 to handle the different types of media being mixed. In this embodiment, for the video mix region 350 a first main frame buffer and a first overlay frame buffer of the same size are instantiated and employed by the mixing process. In particular, when selected by a user for inclusion in the video mix according to respective parameters, an image file from the media pool is decoded and drawn to the first overlay frame buffer according to the parameters. As an example, an image file may be selected by the director using the director user interface 310 to be employed in particular as a watermark, or as a solid image on the lower third of the video layout region 354, or as a solid image occupying the whole of the video layout region 354, or in some custom different way. As such, the image file selected by the director is processed accordingly and the processed image is drawn to the first overlay frame buffer.

The first overlay frame buffer is used so that differential drawing rates may be used for content that changes at different rates, thereby to relieve the GPU of director computing device 300 from having to deal with threads for redundantly re-drawing content that changes less frequently while also drawing content that changes more frequently. Since overlays are expected to change in content infrequently, such as in the case of static images such as static logos, there is no technical need for a GPU to be executing a drawing process for re-drawing such overlays as frequently as is required for the video frames from live or file-based video. In this embodiment, the first overlay frame buffer is drawn-to by the GPU only once a change to the video overlay region 370 is made by a director (such as adding or removing a static image file), and the main frame buffer is drawn-to by the CPU as quickly as needed, which is at least 30 fps and typically faster so as to support delivery of higher frame rates as needed. In this embodiment, an alpha channel is used to store the transparency value for pixels of the images within first overlay frame buffer.

The processing conducted on static image files will, depending on how they are associated with video overlay region 370, include processing the image to render it partly transparent (for use as a watermark), processing the image to upscale or downscale it for use in a lower third of the video mix or for full screen, processing the image to crop it or otherwise to present it in the video mix in a custom way, and so forth. Until the user selects to remove the image file from a scene, to be replaced with another or with nothing, the processed image file remains in the first overlay image buffer for mixing with contents of the first main image buffer.

In this embodiment, HTML canvas capture is used for the first main and the first overlay frame buffers. HTML canvas is a container element available within web browsers for drawing graphics using JavaScript. In some web browsers, where HTML canvas capture is being used, tab switching or application switching will automatically cause redraws in the canvas of a non-foreground tab to slow or to stop, in order to manage resources. This, in turn, causes the output video to freeze. As such, it has been found that using an audio oscillator node, which is not affected by tab switching, to regulate the rendering rate of the HTML canvas by forcing updates enables the rendering to proceed within a tab that is not in the foreground.

Figure 7:
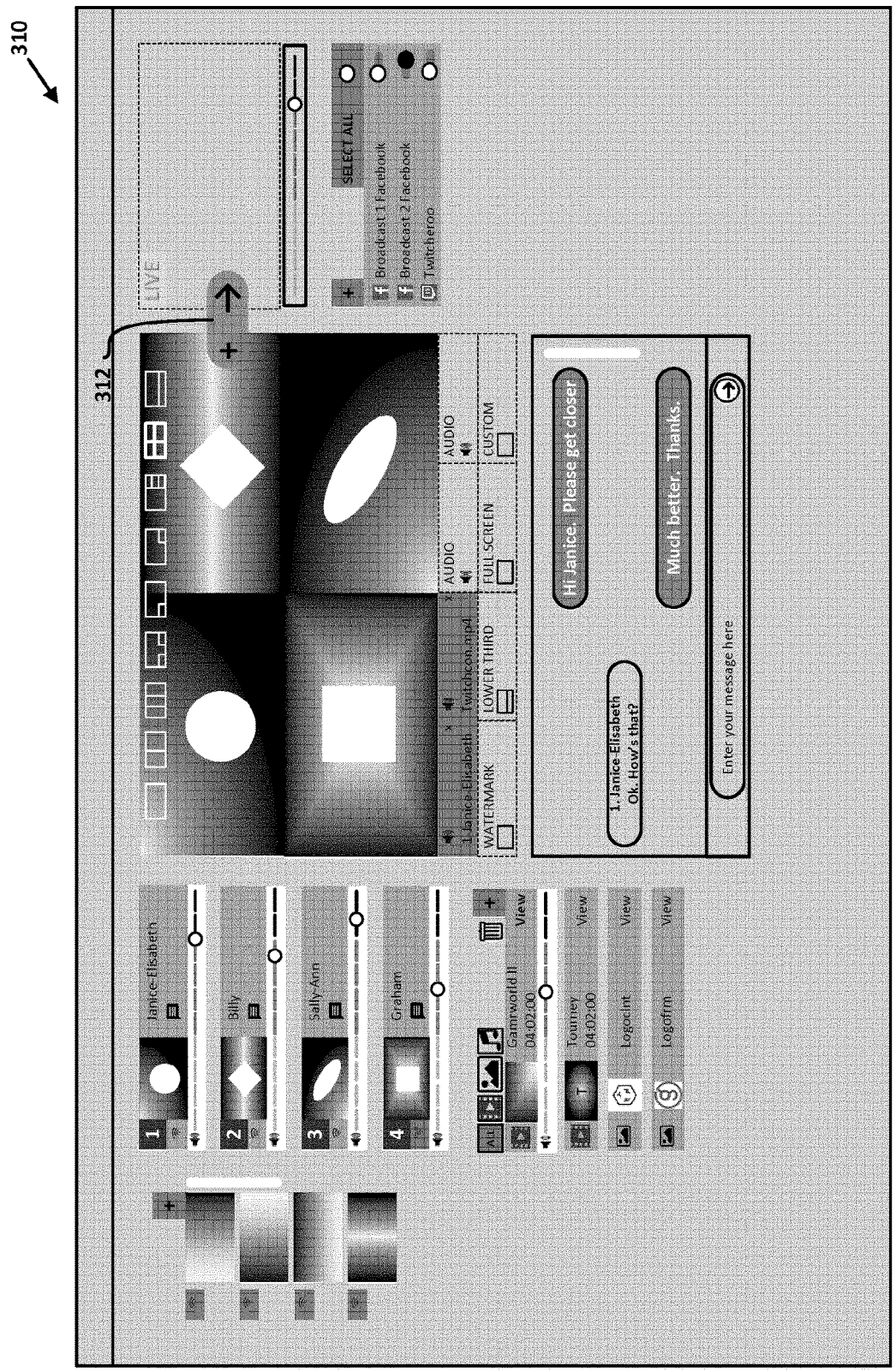
FIG. 7 depicts the browser-based user interface of FIG. 5 with the video mix having been established by the director and thus being ready for broadcasting along with audio.

During mixing, at a rate that, in this embodiment, is faster than a desired frame rate of output video, the mixing process generates output video frames by drawing to the first main frame buffer. For example, the desired frame rate (for output) may be 30 frames per second (fps). In particular, in a continuous loop, the mixing process extracts, from each sequence of video frames it is being presented with and is decoding, a next video frame. After extracting the video frame, the mixing process processes the video frame according to the parameters specified by the director for the respective media stream. For example, a media stream may be selected by a director using the director user interface 310 for inclusion in the upper left quadrant of a four-quadrant scene layout, such as is shown in FIG. 7 for media stream 1. As such, the mixing process will crop and/or scale the video frame to a size corresponding to the size of the upper left quadrant, and will draw that video frame to the first main frame buffer in a location corresponding to the location of the upper left quadrant. The mixing process will conduct these steps for all of the video sequences extracted from the media streams selected by the director for inclusion in the master video mix, thereby to draw content across the entire first main frame buffer.

During each iteration of the loop, with the video frame(s) having been drawn to the first main frame buffer, the mixing process combines the contents of the first overlay frame buffer and the first main frame buffer in accordance with the alpha channel information. This has the effect of "overlaying" a watermark onto the first main frame buffer, or replacing a lower third of the first main frame buffer with the non-null contents of the first overlay frame buffer, and so forth according to the parameters. It will be understood that, in the event that the image in the first overlay frame buffer is selected by the director to be a full screen image, optimizations may be conducted by the mixing process, for example to override the individual processing and drawing of video frames to the first main frame buffer, and simply copy the contents of the first overlay frame buffer to the first main frame buffer at the desired frame rate, thereby to avoid the processing structure of director computing device 300 doing image processing whose results are simply being overwritten by the full screen overlay. On the other hand, to save GPU cycles, pixels in the first overlay image buffer having an alpha channel value of 0 (and thus, being fully transparent) are not combined with correspondingly-located pixels in the first main image buffer.

In an embodiment, in the event that the overlay selected by the director is a video file, rather than a static image file, the first overlay frame buffer may be written to by the mixing process at a higher rate to provide updates to the first overlay frame buffer corresponding to individual video frames of the video file. The mixing process may optimize this process by allocating GPU processing resources according to the video file frame rate (which may be lower than that required for live video, for example) or according to the capabilities of the GPU, thereby to manage the load on the GPU. For example, the highest frame rates will typically be needed for mixing the video from the live incoming media streams and the media pool video files, and optimizations may be automatically or manually employed to enable the GPU to prioritize the high frame rate drawing of such media streams to the main frame buffer over the drawing of overlay video files to the overlay frame buffer. It will be understood that a typical overlay video file may require processing of fewer frame-to-frame differences as compared to a typical live media stream.

With the first main frame buffer having been drawn to as described above, the contents of the first main frame buffer are passed to the director user interface 310 and in particular are drawn to screen to overwrite the contents currently displayed in the scene region 354. As the size of the first main frame buffer may be larger (more pixels) than the scene region 354, the drawing of the contents of the first main frame buffer to the scene region 354 will involve a scaling-down of the contents of the first main frame buffer.

The contents of the first main frame buffer are also added as a video frame to a mixed video stream being produced by the mixing process within the web browser. The application of a time code along with additional processes for incorporating the video frame into the mixed video stream as would be understood is also conducted at this stage.

Also during mixing, at a rate that, in this embodiment, corresponds to the desired sample rate of the output audio, the mixing process generates output audio samples in a first main audio buffer for a first main audio mix. The desired sample rate may, for example, be 48,000 samples per second. If 30 fps is being used for the output video, this corresponds to 1600 audio samples per video frame. As such, the timecode associated with a particular video frame may be also associated with a corresponding set of 1600 audio samples.

In particular, in a continuous loop, the mixing process extracts, from each sequence of audio samples it is being presented with and is decoding, individual sets of audio samples (say, for example, a set of 1600 audio samples). After extracting a particular set of samples from a particular audio sequence, the mixing process processes the set according to the parameters specified by the user using the director user interface 310 for the respective media stream. Using the example given above, in which a (combined audio and video) media stream is selected by the director using the director user interface 310 for inclusion in the upper left quadrant of a four-quadrant scene layout, the audio volume of the audio component of the selected media stream for use in the first master audio mix may be specified by the director such that the mixing process will process the set of audio samples accordingly to set its volume entering the main audio mix. The mixing process will conduct this process for all of the audio sequences extracted from the media streams selected by the director for inclusion in the main audio mix, and will add the samples together and normalize the overall volume, thereby to form a combined set of 1600 samples, in a manner analogous to the drawing of content across the entire first main frame buffer.

The combined set of 1600 samples are also added as an audio "frame" to a main mixed audio stream being produced by the mixing process. The application of a time code along with additional processes for incorporating the audio frame into the main mixed audio stream as would be understood is also conducted at this stage. Various compression or other effects may be applied either just prior to output by the audio interface or as a global effect on the combined set of 1600 samples. The main mixed audio stream is also passed to an audio interface of the director computing device 300 for playback to the director in sync with the display of the mixed video stream.

The mixing process generates a main mixed audio stream as described above, but also produces a custom mixed audio stream for each individual participant whose media streams have been selected by the director for inclusion in the mixed video and mixed audio. The custom mixed audio streams are generated with the corresponding audio component of the incoming media stream effectively muted, so that the respective participant is not being "fed back" their own audio. As such, the mixing process instantiates one or more custom audio buffers—one for each "mixed-in" participant—and associates an identifier corresponding to the mixed-in participant to the custom audio buffer. In this embodiment, into each custom audio buffer the mixing process combines (as described above in connection with the master audio buffer) all of the sets of audio samples from contributing media streams selected for inclusion, except for the set of audio samples extracted from the media stream provided by the corresponding participant. For example, if there are four (4) participants whose media streams have been selected for inclusion in the mixed video and main mixed audio mixes, a custom audio buffer invoked for participant 1 will contain a respective set of audio samples from participants 2, 3, and 4 (along with any audio samples from audio/video files selected from the media pool), whereas a custom audio buffer invoked for participant 2 will contain a respective set of audio samples from participants 1, 3, and 4 (along with any audio samples from audio/video files selected from the media pool). As such, if the number of participants whose media streams have been selected for inclusion in the mixed video stream and main mixed audio stream is N, the number of mixed video streams is 1, the number of main mixed audio streams is 1, and the number of custom mixed audio streams is N. The number of custom mixed audio streams will vary as the director manipulating the director user interface 310 selects fewer or more media streams from various participants for mixing.

In this embodiment, the mixed video stream 370 is respectively encoded and transported to the server system 200 over a respective channel using WebRTC, and the main mixed audio stream 374 is respectively encoded and transported to server system 200 on a respective channel using WebRTC. In addition, the custom mixed audio streams 372A, 372B are respectively transported to server system 200 on respective channels over WebRTC.

The server system 200 will only relay a copy of the mixed video stream 370 to each of the respective participant computing devices 100 after a director has pressed a "Go Live" control 312 on director user interface 310 to cause the results of the mixing to be switched out for broadcast. Similarly, the server will only relay the custom mixed audio streams 372A, 372B to respective participant computing devices 100 after a director has pressed control 312. The relaying of the mixed video stream 370 and respective custom mixed audio streams 372A, 372B is done over WebRTC channels. An input process operating within respective web browsers or local applications on participant computing devices 100 receive the incoming WebRTC streams, and handle any local buffering to ensure that routing of the custom mixed audio streams to the audio interface for output to the speaker of the participant computing device 100 and routing of the mixed video stream 370 to the participant user interface 110 for display for the participant can be done in synchrony. The participant using a respective participant computing device 100 thereby can see how they appear in the live scene being broadcast, can see similarly how other the participants appear, and can hear and accordingly converse with the other participants being included, all without hearing their own audio being fed back with a delay.

FIG. 7 depicts the browser-based user interface of FIG. 5 with the first scene having been built by the user and thus ready for going live to broadcast. In particular, the director has selected the fourth of four live media streams from the lineup region 330 for inclusion in the upper right-hand corner of the layout region 354. Once all subregions of the layout region 354 have been populated with content by selection as described above, the "Go Live" control 312 is automatically presented and made available in director user interface 310 for selection by the director. Selecting control 312 causes the mixing process involving the incoming live media streams, overlay video and audio items, layout information, and parameters that are associated with the first overlay image buffer, the first main image buffer, the main mixed audio buffer and custom mixed audio buffers to be passed to a second overlay image buffer, a second main image buffer, a main live audio buffer and custom live audio buffers. In turn, the looped processing that was conducted by the mixing process for audio and video in connection with the first overlay image buffer, the first main image buffer, the main mixed audio buffer and the custom mixed audio buffers continues instead in connection with the second overlay image buffer, the second main image buffer, the main live audio buffer and the custom live audio buffers. Based on the mixing process drawing, for live audio and video, from the second overlay image buffer, the second main image buffer, and the main live audio buffer, a live video stream 370 continues to be constructed, encoded and transported to the server system 200 over a respective channel using WebRTC, and a live audio stream 374 continues, respectively to be constructed, encoded and transported to server system 200 on a respective channel using WebRTC. This is referred to as continuing as opposed to initiating, since from about the time of initiation of the session a black (default) live video stream based on an "empty" second overlay image buffer and an "empty" main image buffer was being continually constructed, encoded and transported to server system 200, as was a silent (default) live audio stream based on an "empty" main live audio buffer. As such, going live with actual content may be done very quickly since connection negotiations and process instantiation at server system 200 has already been done upon initiation.

Participant computing devices 100 whose media streams have been mixed into the video and audio streams that have gone live are provided by server system 200 with a status update such that participant user interfaces 110 running on participant computing devices 100 can display a "Live" status message to the participant.

In the event that a director, using director user interface 310, de-activates an output to a destination computing device 400, the director user interface 310 sends a message to distribution manager 216 to stop sending the main live video stream 376 and main live audio stream 378 to the respective destination computing system 400 and closes the connection. The distribution manager 216 then re-kindles a new connection to the respective destination computing system 400 thereby to prepare to stream media as desired by the director.

Figure 8:
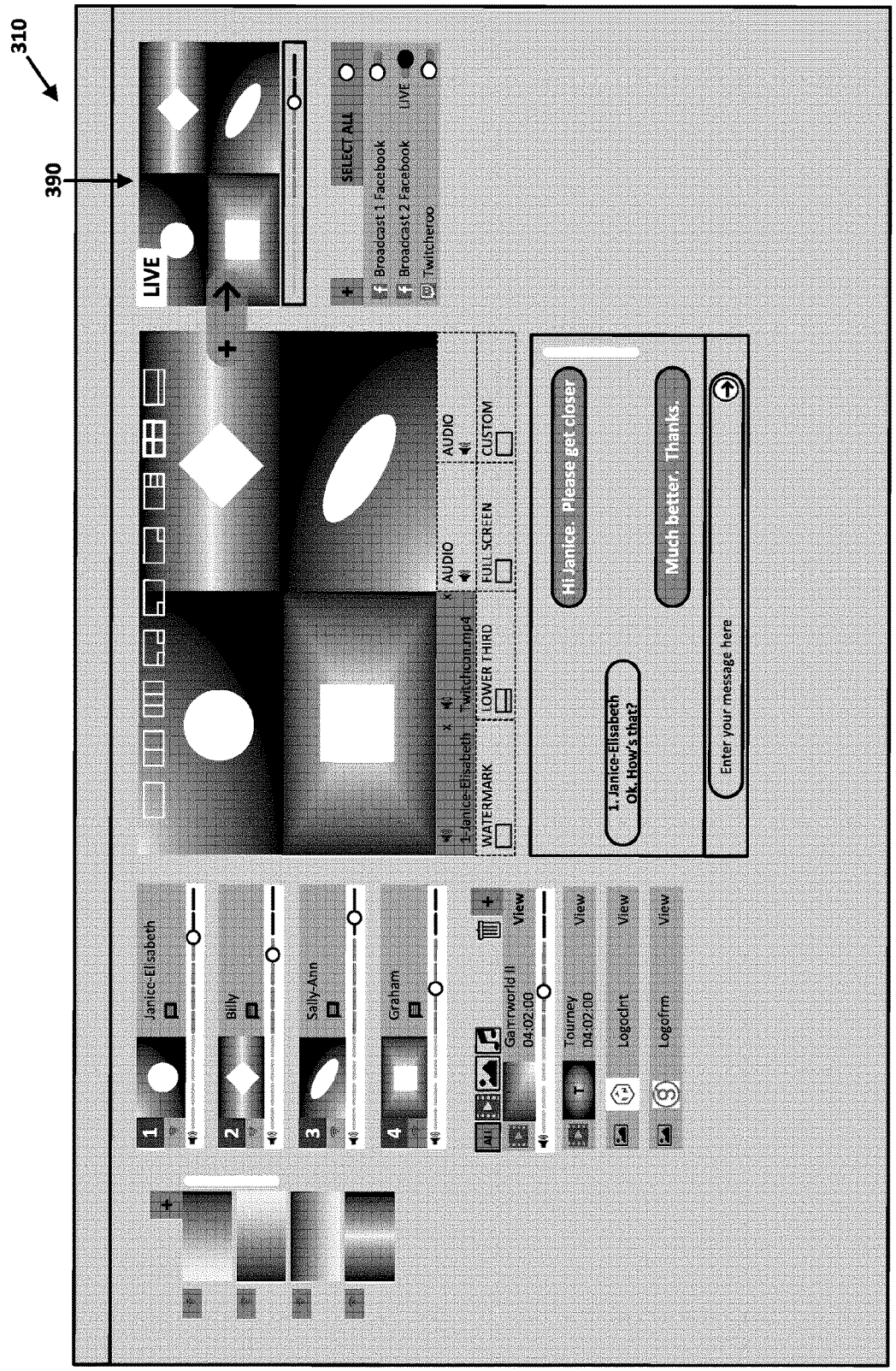
FIG. 8 depicts the browser-based director user interface of FIG. 7 in a different state, in particular with a "Go Live" control having been recently selected.

FIG. 8 depicts the browser-based director user interface 310 of FIG. 7 in a different state, in particular with the "Go Live" control 312 having been recently selected. It can be seen that the live monitor region 390 displays the video mix that was prepared by the director and authorized to go live such that the corresponding live video and live audio streams are being streamed to and restreamed from server system 200 to a respective destination computing device 400.

Figure 9:
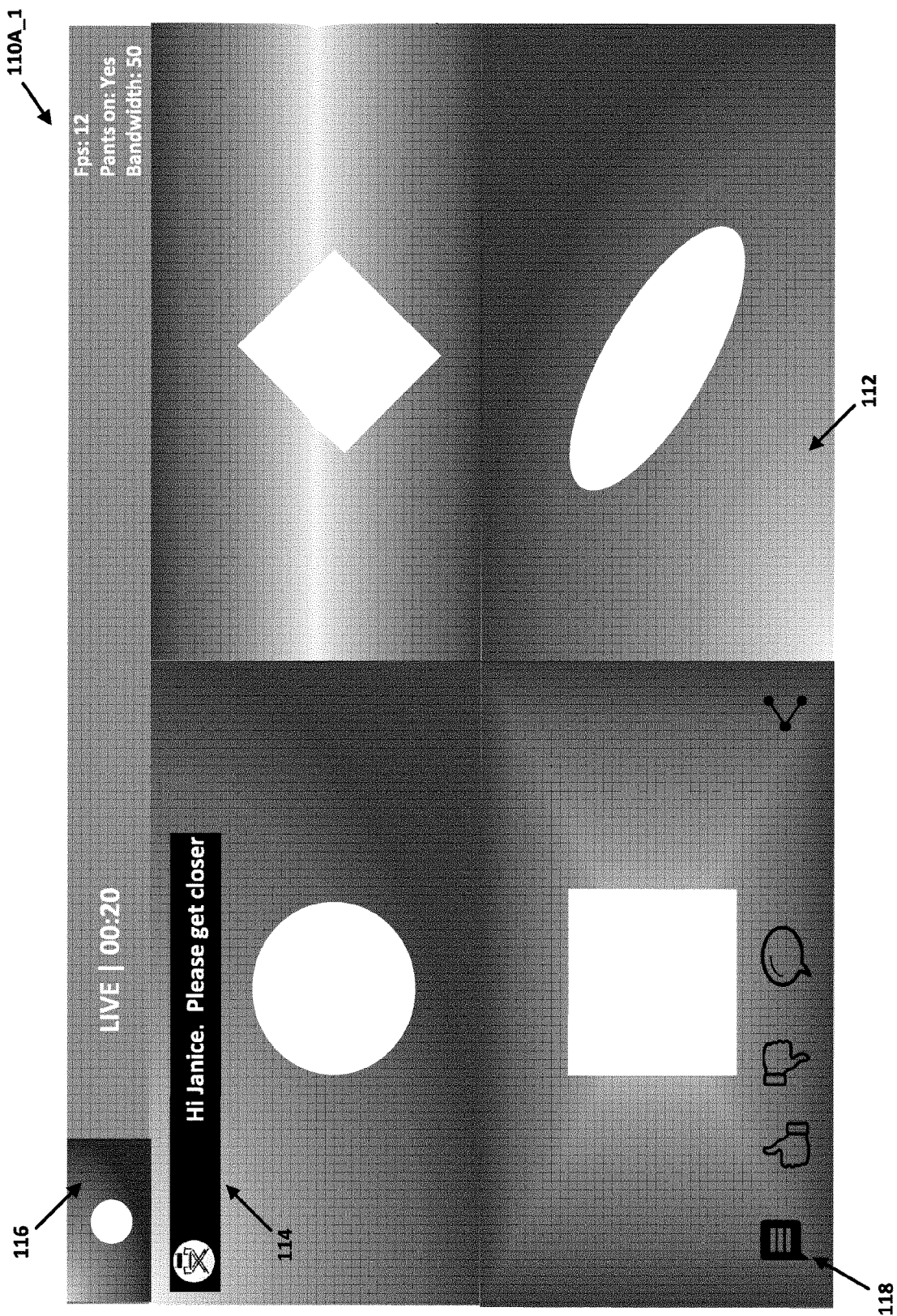
FIG. 9 depicts a browser-based participant user interface for a participant computing device, such as would be displayed on the display screen of a laptop or desktop computing device, according to an embodiment.

FIG. 9 depicts a browser-based participant user interface 110A_1 for a participant computing device 100A, such as would be displayed on the display screen of a laptop or desktop computing device, according to an embodiment. Participant user interface 110 presents the incoming media stream 270A, which includes a copy of the mixed video stream 370 and a copy of the respective custom mixed audio stream 372A, by displaying the video component in a central region 112 onscreen and routing the audio component to an audio interface of the participant computing device 100A to be played back in sync with the video component. A text message 114 sent from director computing device 300 via the messaging service instantiated on server system 200 for the session, is displayed on the display screen. A status bar 116 at the top shows a local video feed to the user, the status (in this case "LIVE") of the broadcast containing the participant's video feed, some diagnostics 117 and feed status information. Selectable icons 118 are displayed for enabling the participant to communicate.

Figure 10:
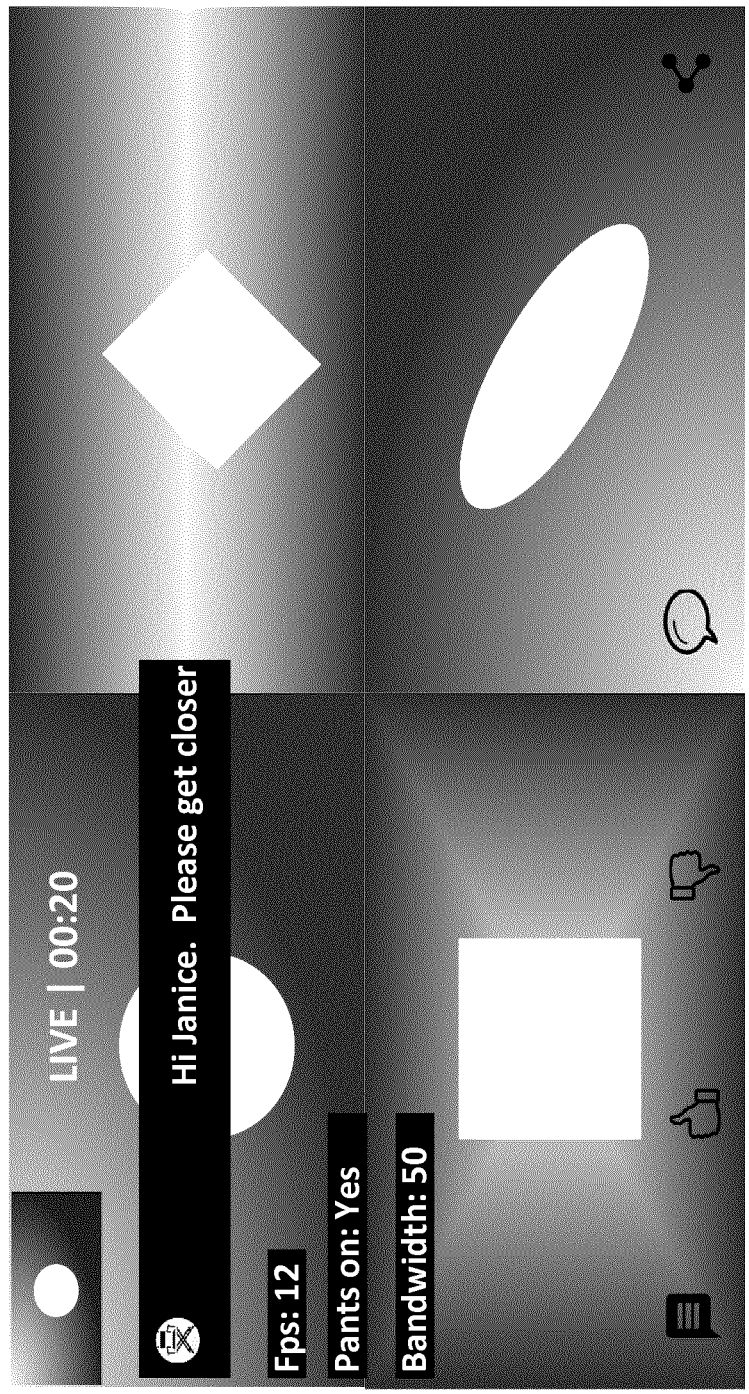
FIG. 10 depicts an alternative browser-based participant user interface for a participant computing device, such as would be displayed on the display screen of a tablet computing device, according to an embodiment.

FIG. 10 depicts an alternative browser-based participant user interface 110A_2 for a participant computing device 100A, such as would be displayed on the display screen of a tablet computing device, according to an embodiment.

Figure 11:
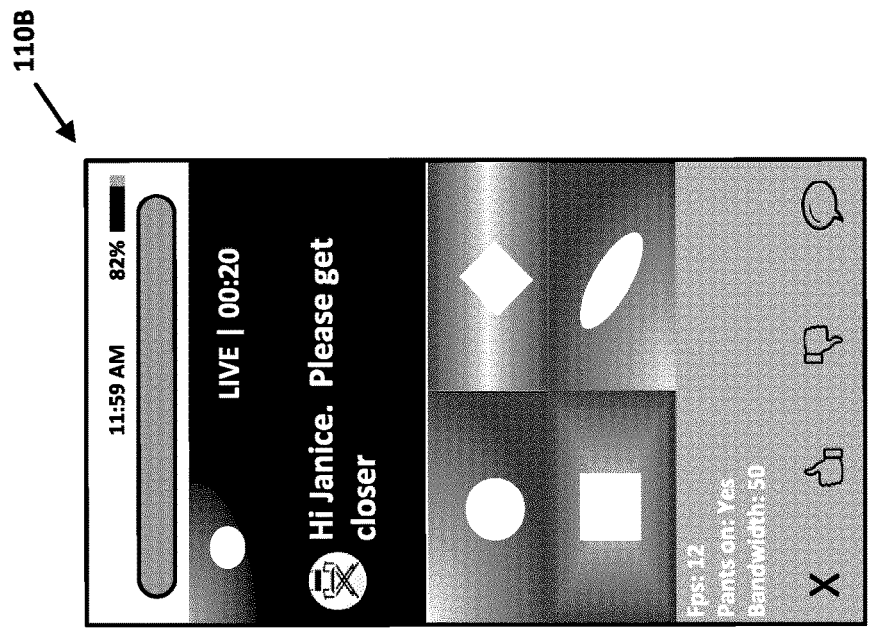
FIG. 11 depicts an application-based user interface for a participant computing device such as would be displayed on the display screen of a smartphone computing device such as an iOS-based device, according to an embodiment.

FIG. 11 depicts an application-based participant user interface 110B for a participant computing device 100B such as would be displayed on the display screen of a smartphone computing device such as an iOS-based device, according to an embodiment.

Figure 12:
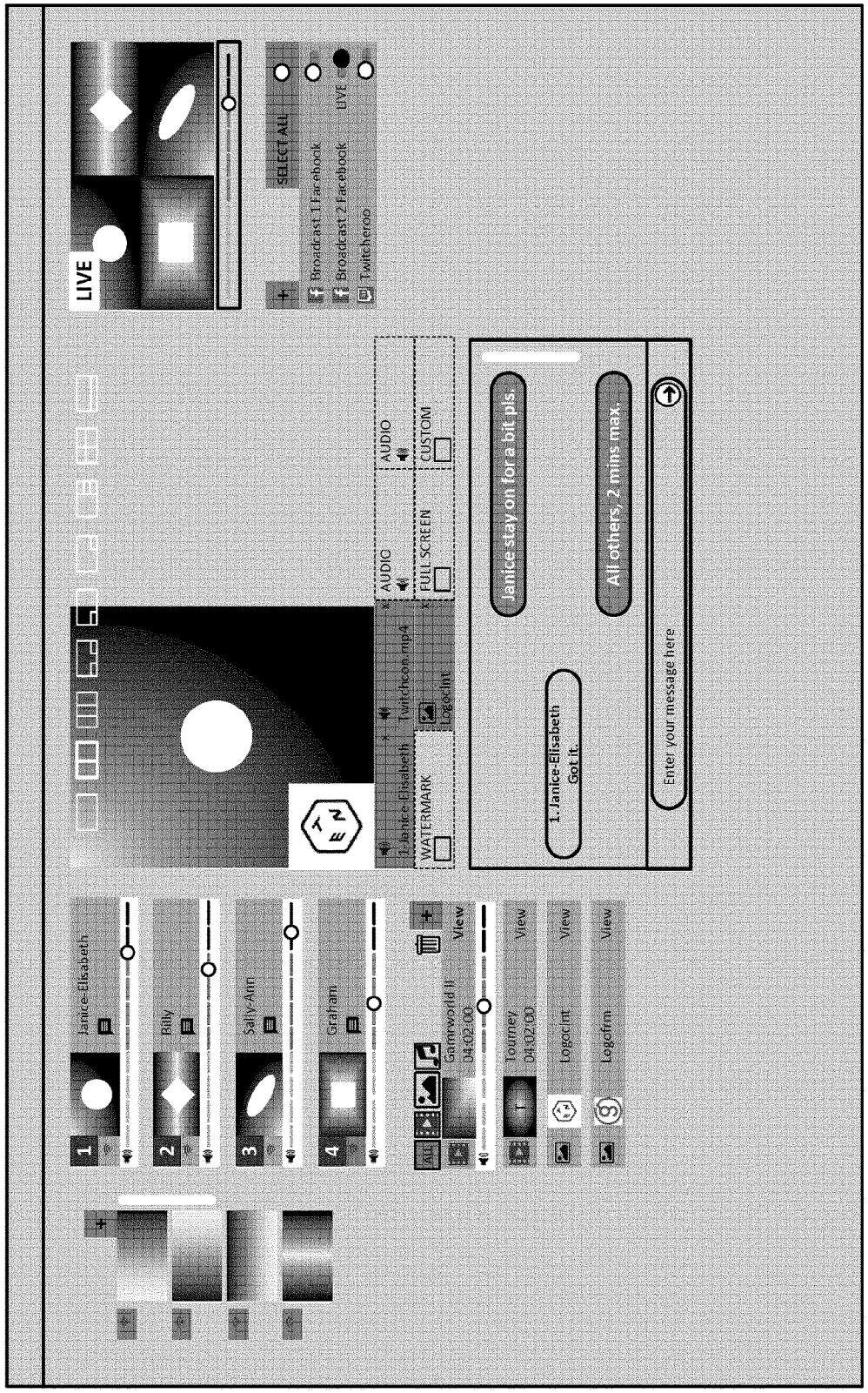
FIG. 12 depicts the browser-based director user interface of FIG. 8 in a different state.

FIG. 12 depicts the browser-based director user interface of FIG. 8 in a different state, in particular with video and audio streams based on the mixing processes being conducted in conjunction with the second overlay image buffer, the second main image buffer, the main live audio buffer and the main custom audio buffers being streamed to and restreamed from server system 200, while the mixing processes being conducted in conjunction with first overlay image buffer, first main image buffer, main mixed audio buffer and custom mixed audio buffers are reflected in the scene region 354, the persistent audio region 360 and the video overlay region 370. In this example, a representation 342 of still image file "LogocInt" has been selected and associated with a portion of the video overlay region 370 for a "lower third" overlay. Furthermore, a different layout has now been selected for scene region 354 by the director from layout selector 352. The audio and video streams that had been arranged and authorized for broadcasting continue to be streamed, as shown in the live monitor region 390.

Figure 13:
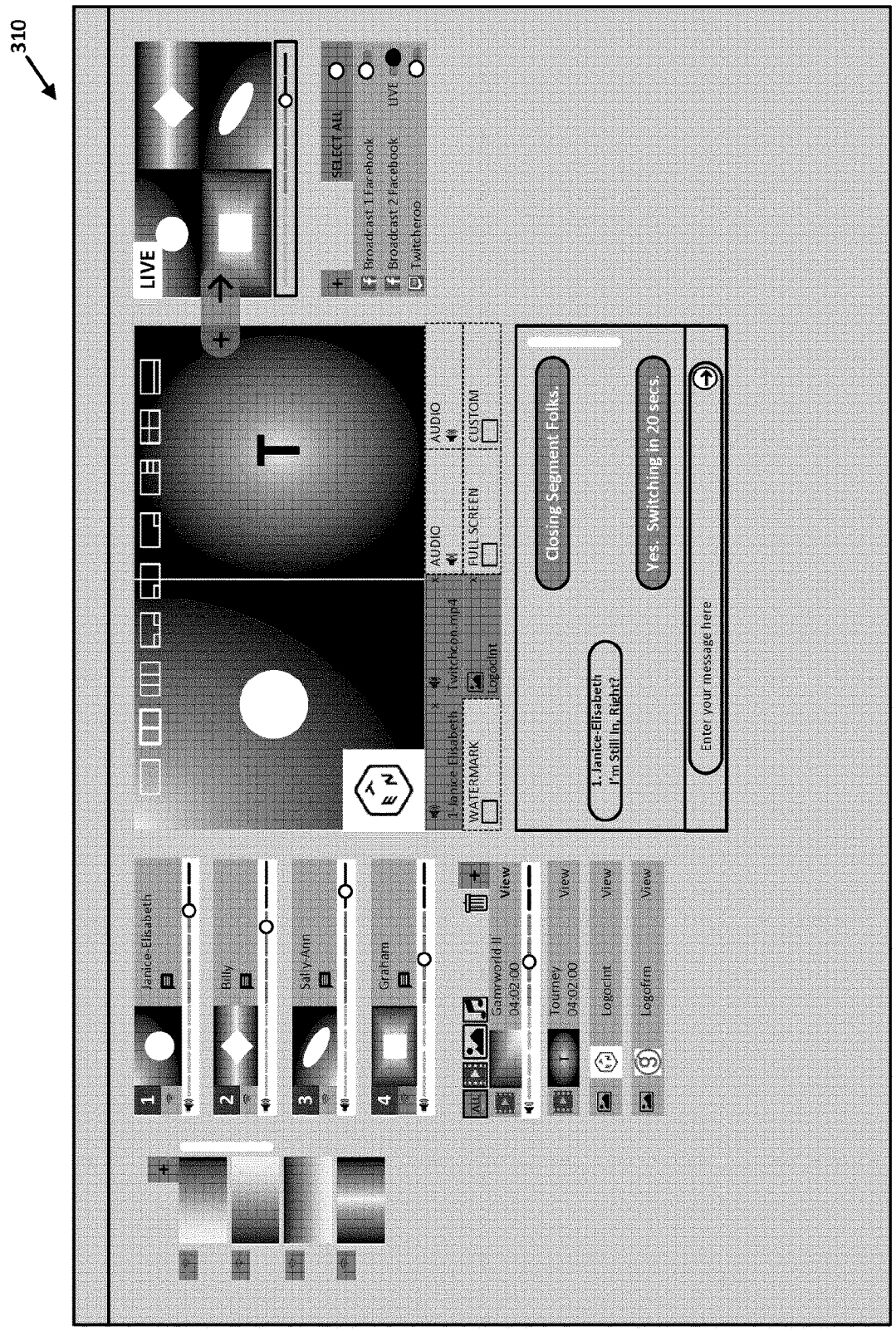
FIG. 13 depicts the browser-based director user interface of FIG. 12 in a different state.

FIG. 13 depicts the browser-based director user interface 310 of FIG. 12 with the scene region 354 having been fully populated and thus ready for going live. In particular, the director has selected a video file from the media pool region 340 and associated the video file with the right half of the newly selected layout thereby to fully populate the scene region 354. As such, the director user interface 310 automatically displays the "Go Live" control 312. This, when selected, will cause the mixing process involving the (newly arranged) selection of live media streams, overlay video and audio items, layout information, and parameters that are associated with the first overlay image buffer, the first main image buffer, the main mixed audio buffer and the custom mixed audio buffers to be passed to the second overlay image buffer, the second main image buffer, the main live audio buffer and the custom live audio buffers. This supplants them while continuing to stream the resultant live video stream 370 and main live audio streams 374 to server system 200 for downstream handling such as broadcasting.

Figure 14:
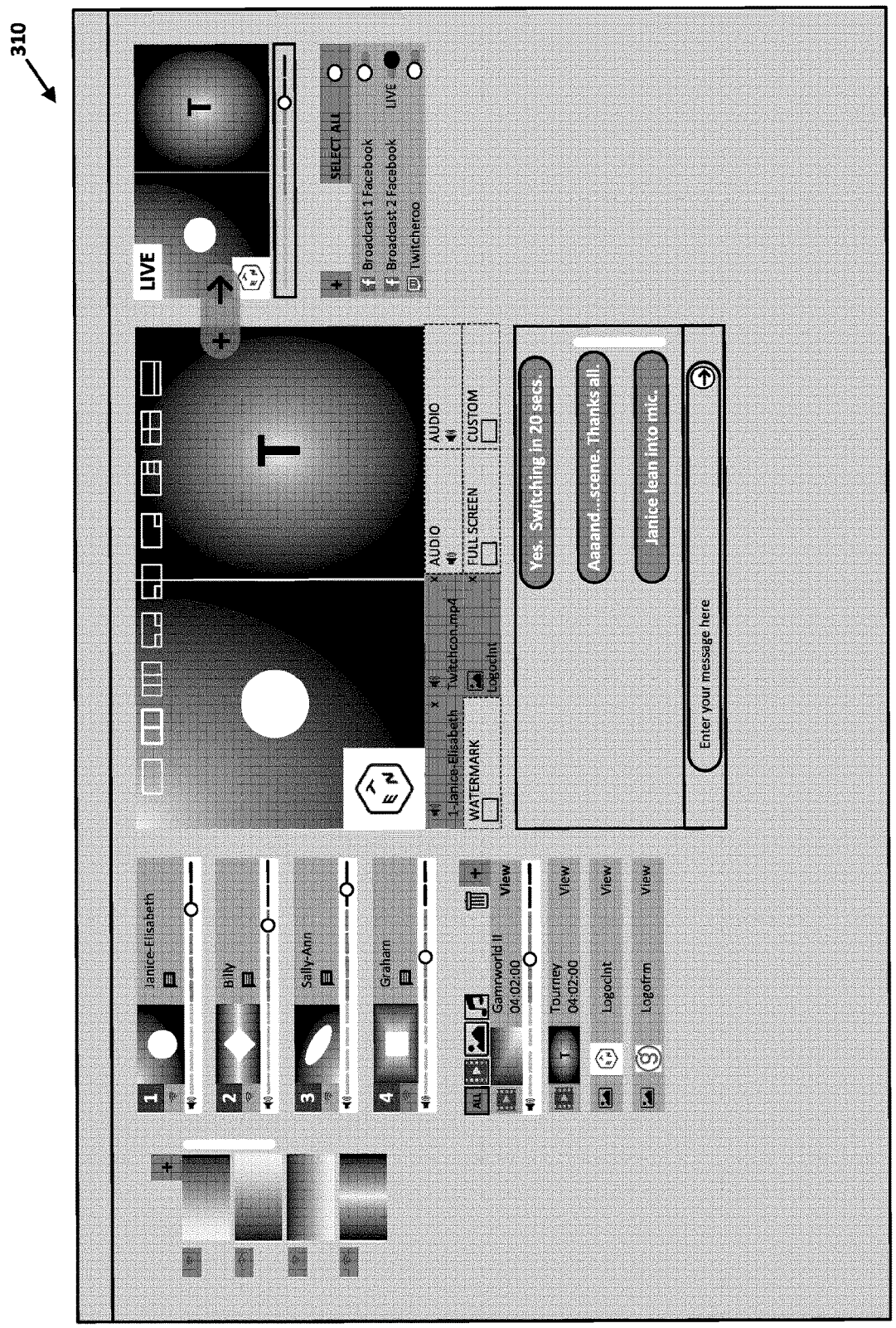
FIG. 14 depicts the browser-based director user interface of FIG. 13 in a different state, in particular with the "Go Live" control having been recently selected.

FIG. 14 depicts the browser-based director user interface 310 of FIG. 13 in a different state, in particular with the "Go Live" control 312 having been recently selected.

Figure 15:
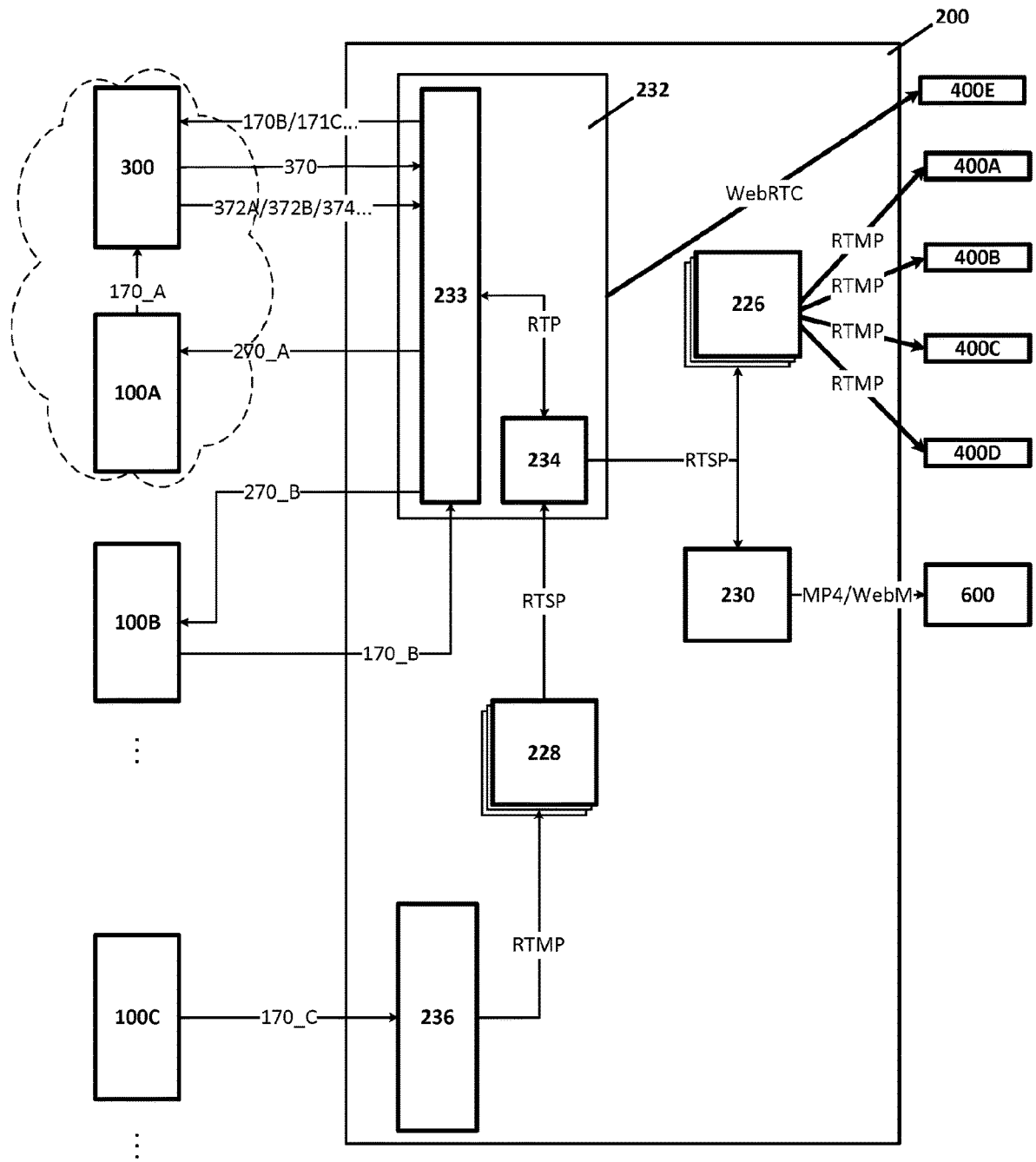
FIG. 15 is a block diagram showing a modified media stream architecture usable in the live-media streaming system of FIG. 1, according to an alternative embodiment.

FIG. 15 is a block diagram showing a modified media stream architecture usable in the live-media streaming system of FIG. 1, according to an alternative embodiment. The media stream architecture of FIG. 15 is similar to that of FIG. 4. However, the media stream architecture of FIG. 15 enables director computing device 300 to, under certain circumstances, receive a media stream directly from a participant computing device 100A as a peer for mixing, rather than via server system 200.

In FIG. 15, participant computing device 100A and director computing device 300 happen to be part of the same local network, depicted with a small cloud in FIG. 15. As a result, participant computing device 100A and director computing device 300 share a public IP address. When a broadcast is being set up and participant computing devices are making contact with server system 200, server system 200 detects whether the public IP address of participant computing devices are the same as that of director computing device 300. In the event that the director computing device 300 and a participant computing device 100 share the same IP address, server system 200 can instruct the participant computing device 100 to stream its live media directly to the director computing device 300 over the local network that they share. In FIG. 15, participant computing device 100A has been instructed by server system 200 to stream its live media stream 170_A directly to director computing device 300 over WebRTC as a network peer of director computing device 300. Director computing device 300 can thereafter mix live media stream 170_A, and direct mixed audio/video streams out to server system 200. Server system 200 provides a respective copy of the mixed audio/video stream to participant computing device 100A for monitoring.

The detecting of the common public IP addresses and the corresponding orchestration for instructing participant computing device 100A and director computing device 300 to communicate as peers for this purpose is provided by API server 212 and distribution manager process 216 (see FIG. 3). These components, when establishing connections and handling connection requests can, in accordance with system settings, select to require the WebRTC stream from participant computing device 100A to pass through server system 200, or to alternatively go directly to director computing device 300 over the local network it has in common with participant computing device 100A.

By enabling server system 200 to leverage the common local network to support peer to peer sharing of live media streams—to control network routing, to a degree—server system 200 saves itself and intervening network resources outside of the local network from having to convey, ingest and re-distribute the live media streams out of and into the local network. This can also reduce latency.

In embodiments, server system 200 may direct all incoming live streams from participant computing devices 100 to be routed to director computing device 300 as peers, whether or not they share the same public IP address. However, implementers should bear in mind that this might expose the public IP addresses of computing devices that are outside of the local network of the director computing device to what might be untrusted devices. This may be undesirable as a security concern, unless computing devices that are deemed as "trusted" devices, whether part of the local network or not, are authorized to be connected to director computing device 300 as peers. This may be regulated at the point at which invitations to participants are provided, so that trusted participants receive an invitation link that, when clicked, signals the server system 200 that the participants are trusted. Participants that are invited but are not necessarily trusted would receive a different format of link that, when clicked, would signal the server system 200 that the participants are not trusted. Orchestration by API server 212 and distribution manager process 216 would be done differently depending on whether a participant computing device 100 was deemed trusted or not.

While determinations as to whether a participant computing device 100 is on the same local network as the director computing device 300 are conducted by server system 200, alternatives are possible. For example, a given participant computing device 100 or director computing device might conduct a PING test against the other, if viable given the network architecture and the relationship between the devices prior to the broadcast time.

Although embodiments have been described with reference to the drawings, those of skill in the art will appreciate that variations and modifications may be made without departing from the spirit, scope and purpose of the invention as defined by the appended claims.

For example, while embodiments described herein involve the broadcasting of media streams transported from a browser-based mixing system to a server system for, in turn, being conveyed for broadcasting by a destination computing system, alternatives are possible. For example, broadcasting may be conducted by the server system itself rather than another, downstream system. Such broadcasting may be done by server system to provide streams in one or more various formats, such as for example in a WebRTC-based format, a Peer-to-Peer format of some other sort, or a live chunked media stream format.

Furthermore, while embodiments disclosed herein involve the streaming of mixed video and mixed audio from a browser-based mixer over WebRTC to a server system, alternatives are possible. For example, such streaming may be conducted using another format for streaming the mixed video and the mixed audio.

Furthermore, while embodiments disclosed herein involve the streaming of mixed audio from the browser-based mixer in association with mixed video, alternatives are possible. For example, the audio streamed in association with the mixed video may not have been mixed with other audio, and may instead have been received within the browser-based mixer from, for example, a local audio source and streamed in association with the mixed video.

Furthermore, embodiments of a useful and inventive overall system for broadcasting live media streams may employ all or a subset of, or individual ones, of the individual inventive concepts, devices, methods, techniques and aspects that are described and shown herein. For example, an individual user may employ a browser-based mixer such as is described and shown herein from time to time as more simply a console for self-broadcast and director control, without necessarily mixing in other live media streams in the manner described herein.

What is claimed is:

1. A content delivery system for live streams comprising:
an origin server executing one or more WebRTC origin pools each in communication with one or more director device to receive from each of the one or more director device a respective live stream, each WebRTC origin pool generating a WebRTC stream based on a received live stream;
at least one edge server, each edge server remote from the origin server and executing one or more WebRTC edge pool each in communication with one or more of the WebRTC origin pool to receive one or more of the respective generated WebRTC stream; and
a load balancer associated with the at least one edge server and configured to conduct load balancing by directing each of a plurality of stream requests from requesting viewer devices to a selected WebRTC edge pool, wherein, responsive to the directing of a request, the selected WebRTC edge pool enters into communication with a requesting viewer device to serve a requested one of the received WebRTC stream to the requesting viewer device;
wherein each of the edge servers is configured to, responsive to at least one of: (a) demand for content by viewer devices increasing to a point where it is anticipated that additional resources will be needed to maintain a quality of service (QoS), and (b) a number of stream requests being served exceeding a threshold:
instantiate at least one additional WebRTC edge pool for executing on the edge server;

request one or more of the WebRTC origin pool to enter into communication with each of the at least one additional WebRTC edge pool for each of the at least one additional WebRTC edge pool to receive one or more of the respective generated WebRTC stream; and inform the load balancer of an availability of the at least one additional WebRTC edge pool for selecting by the load balancer for directing stream requests from requesting viewer devices.

2. The content delivery system of claim 1, further comprising:

a load balancer associated with the origin server and configured to conduct load balancing by directing each live stream from each of the one or more director device to a selected one of the one or more WebRTC pools.

3. The content delivery system of claim 1, wherein the origin server executes a plurality of WebRTC origin pools, at least one of which is in communication with one or more director device.

4. The content delivery system of claim 3, wherein at least one of the at least one edge server executes a plurality of WebRTC edge pools each in communication with one or more of the plurality of WebRTC origin pools to receive one or more of the respective generated WebRTC stream.

5. The content delivery system of claim 1, wherein the at least one edge server comprises a plurality of edge servers.

6. The content delivery system of claim 1, wherein one or more of the viewer devices is in communication with at least one of the one or more WebRTC origin pools to receive one or more of the respective generated WebRTC stream.

7. The content delivery system of claim 1, further comprising:

at least one intermediary server in communication with the origin server and a respective one of the at least one edge server, the at least one intermediary server configured to receive one or more generated WebRTC stream from one of the one or more WebRTC origin pools, generate corresponding transcoded one or more WebRTC streams, and serve the transcoded one or more WebRTC streams to one or more WebRTC edge pool.

8. The content delivery system of claim 7, wherein the at least one intermediary server is further configured to negotiate at least one quality of service metric with the respective one of the at least one edge server, wherein the transcoded one or more WebRTC streams are transcoded based on the at least one quality metric.

9. The content delivery system of claim 7, wherein the one or more generated WebRTC stream from one or the one or more WebRTC origin pools contains' media data encoded in a scalable video coding (SVC) format, and the corresponding transcoded one or more WebRTC streams contain the media data encoded in a non-SVC format.

10. The content delivery system of claim 9, wherein the non-SVC format is H.264.

11. The content delivery system of claim 9, wherein the media data encoded in the non-SVC format has a lower resolution than the media data contained in the input WebRTC stream.

* * * * *